US012277619B2

(12) United States Patent
Frederick et al.

(10) Patent No.: US 12,277,619 B2
(45) Date of Patent: Apr. 15, 2025

(54) PROVIDING INTERFACES WITH SCHEDULED TRANSPORTATION OPTIONS TO INTELLIGENTLY GENERATE TRANSPORTATION GROUPS

(71) Applicant: Lyft, Inc., San Francisco, CA (US)

(72) Inventors: Adriel Samuel Frederick, Berkeley, CA (US); Simon Jack Jenkins, San Francisco, CA (US); Ryan Lok Yan Ma, San Francisco, CA (US); Keshav Puranmalka, Seattle, WA (US); Pratik Hirachand Shah, San Francisco, CA (US); Jessica Kelly T Talbert, San Francisco, CA (US); Rebecca Lindsay Blum, San Francisco, CA (US); Mayank Gulati, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 840 days.

(21) Appl. No.: 17/020,443

(22) Filed: Sep. 14, 2020

(65) Prior Publication Data
US 2022/0084155 A1 Mar. 17, 2022

(51) Int. Cl.
*G06Q 50/40* (2024.01)
*G06Q 10/1093* (2023.01)
(52) U.S. Cl.
CPC ......... *G06Q 50/40* (2024.01); *G06Q 10/1097* (2013.01)
(58) Field of Classification Search
None
See application file for complete search history.

(56) References Cited

U.S. PATENT DOCUMENTS

| 10,937,115 | B2* | 3/2021 | Stumpf | G06Q 10/063114 |
| 2011/0054956 | A1* | 3/2011 | Meyer | G06Q 10/02 705/5 |
| 2012/0041675 | A1* | 2/2012 | Juliver | G06Q 10/08 701/465 |
| 2012/0078672 | A1* | 3/2012 | Mohebbi | G06Q 10/08 701/527 |

(Continued)

OTHER PUBLICATIONS

Bathla, Kanika, et al. "Real-time distributed taxi ride sharing." 2018 21st International Conference on Intelligent Transportation Systems (ITSC). IEEE, 2018 (Year: 2018).*

(Continued)

*Primary Examiner* — Darlene Garcia-Guerra
(74) *Attorney, Agent, or Firm* — Keller Preece PLLC

(57) ABSTRACT

The present disclosure relates to systems, non-transitory computer-readable media, and methods for dynamically matching requestor devices to generate efficient transportation groups that satisfy user-selected arrival deadlines. In particular, in one or more embodiments, the disclosed systems generate timeslots corresponding to a transportation request including pick-up times, arrival deadlines, and transportation values. In response to receiving user selections of timeslots, the disclosed systems can partition requestor devices into sets of requestor devices. Additionally, the disclosed systems can utilize the sets of requestor devices to match compatible requestor devices to both maximize system efficiency and satisfy selected arrival deadlines for each requestor device.

20 Claims, 15 Drawing Sheets

(56) References Cited

U.S. PATENT DOCUMENTS

| | | | | |
|---|---|---|---|---|
| 2014/0173511 | A1* | 6/2014 | Lehmann | G06Q 10/02 715/810 |
| 2016/0027306 | A1* | 1/2016 | Lambert | G08G 1/202 701/117 |
| 2017/0138749 | A1* | 5/2017 | Pan | G01C 21/3438 |
| 2017/0167882 | A1* | 6/2017 | Ulloa Paredes | G01C 21/3438 |
| 2018/0032919 | A1* | 2/2018 | Meunier | G06Q 10/06 |
| 2018/0101878 | A1* | 4/2018 | Marueli | G06Q 30/0284 |
| 2018/0108103 | A1* | 4/2018 | Li | G08G 1/202 |
| 2018/0356239 | A1* | 12/2018 | Marco | G08G 1/005 |
| 2019/0171798 | A1* | 6/2019 | Boghossian | G06F 21/31 |
| 2020/0104965 | A1* | 4/2020 | Ramot | G06Q 50/30 |
| 2020/0300645 | A1* | 9/2020 | Schirano | G01C 21/3676 |
| 2020/0410405 | A1* | 12/2020 | ElShenawy | G06Q 50/30 |
| 2022/0003561 | A1* | 1/2022 | Shoval | G01C 21/362 |
| 2022/0051283 | A1* | 2/2022 | Chen | G06Q 30/0224 |
| 2023/0140268 | A1* | 5/2023 | Hochberg | G06Q 10/06315 701/533 |

OTHER PUBLICATIONS

Tang, Lei, et al. "Recommendation for ridesharing groups through destination prediction on trajectory data." IEEE Transactions on Intelligent Transportation Systems 22.2 (2019): 1320-1333 (Year: 2019).*

Duan, Yubin, Ning Wang, and Jie Wu. "Optimizing order dispatch for ride-sharing systems." 2019 28th International Conference on Computer Communication and Networks (ICCCN). IEEE, 2019 (Year: 2019).*

Qian, Xinwu, et al. "Optimal assignment and incentive design in the taxi group ride problem." Transportation Research Part B: Methodological 103 (2017): 208-226 (Year: 2017).*

* cited by examiner

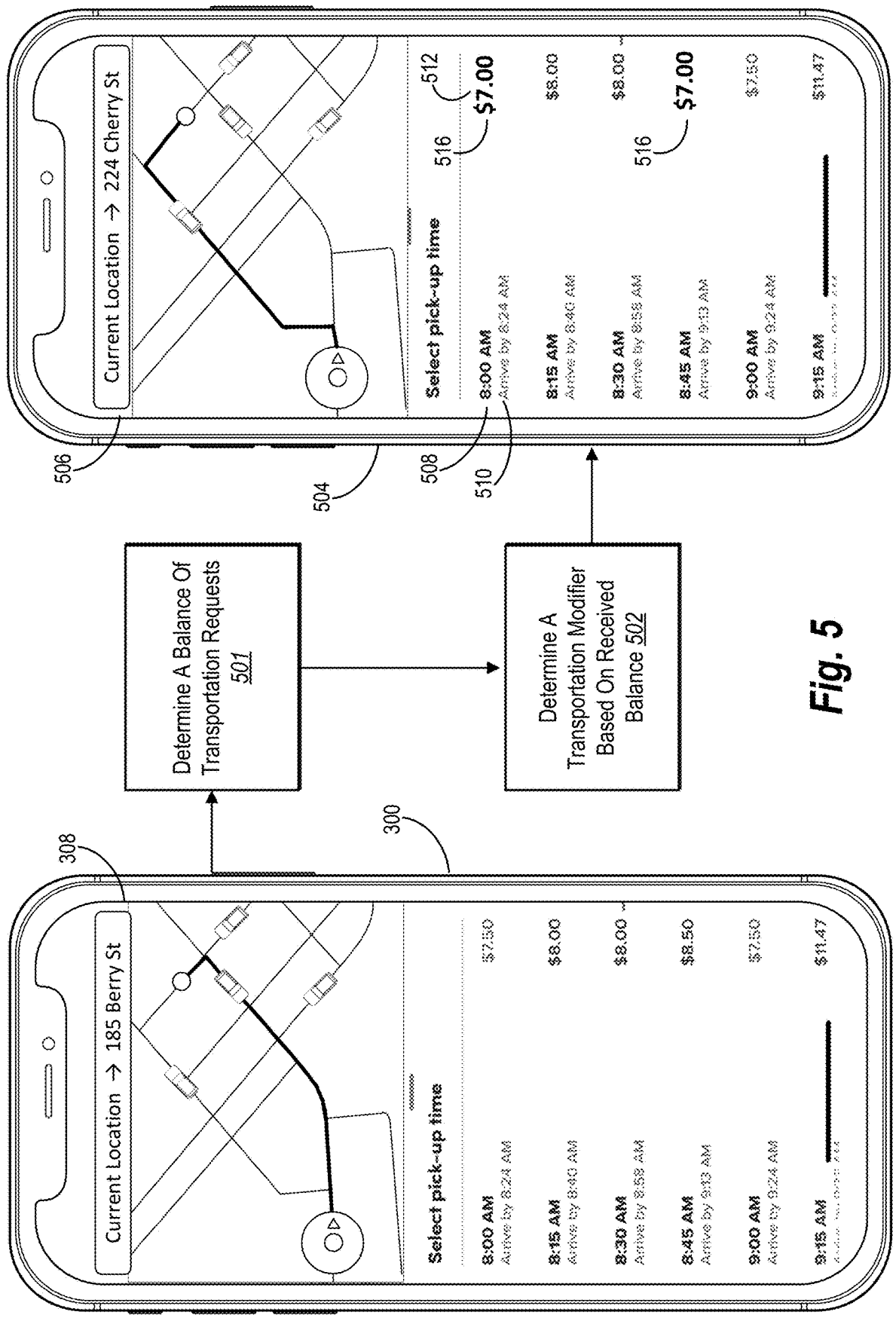

PROVIDING INTERFACES WITH SCHEDULED TRANSPORTATION OPTIONS TO INTELLIGENTLY GENERATE TRANSPORTATION GROUPS

BACKGROUND

Recent years have seen significant development in transportation matching systems that utilize web and mobile applications to match provider devices to real-time on-demand transportation requests from requestor devices. For example, on-demand transportation matching systems can match provider devices with requestor devices to provide transportation. Although transportation matching systems can match multiple requestors with providers, such systems suffer from a number of technical problems, particularly in flexibility, accuracy, and efficiency of implementing computer systems.

BRIEF SUMMARY

Embodiments of the present disclosure provide benefits and/or solve one or more of the foregoing or other problems in the art with systems, non-transitory computer-readable media, and methods for providing transportation graphical user interfaces to requestor devices that include scheduled transportation options and dynamically monitoring digital activity of requestor devices to generate transportation groups (corresponding to selected timeslots) that satisfy arrival deadlines. More specifically, the disclosed systems can provide graphical user interfaces to requestor devices that include current transportation request options (e.g., for immediate pickup) and scheduled transportation request options (e.g., for future pickup). In response to selection of a scheduled transportation request option, the disclosed systems can provide a scheduled transportation request graphical user interface that includes pre-scheduled timeslots with corresponding pick-up times, arrival deadlines, and transportation values. Based on selection of one of the pre-scheduled timeslots, the disclosed systems and methods can monitor digital activity of other requestor devices and select a subset of such devices to form a transportation group (e.g., a group of requestor devices that can be combined into a single shared reservation for a transportation service). The disclosed systems can then determine a transportation match with a provider device and provide navigational instructions to the provider device such that the requestor devices within the transportation group arrive at their respective destinations within designated arrival deadlines.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 5 illustrates a diagram of dynamically updating timeslots based on updated balances of transportation requests in accordance with one or more embodiments.

DETAILED DESCRIPTION

Figure 1:
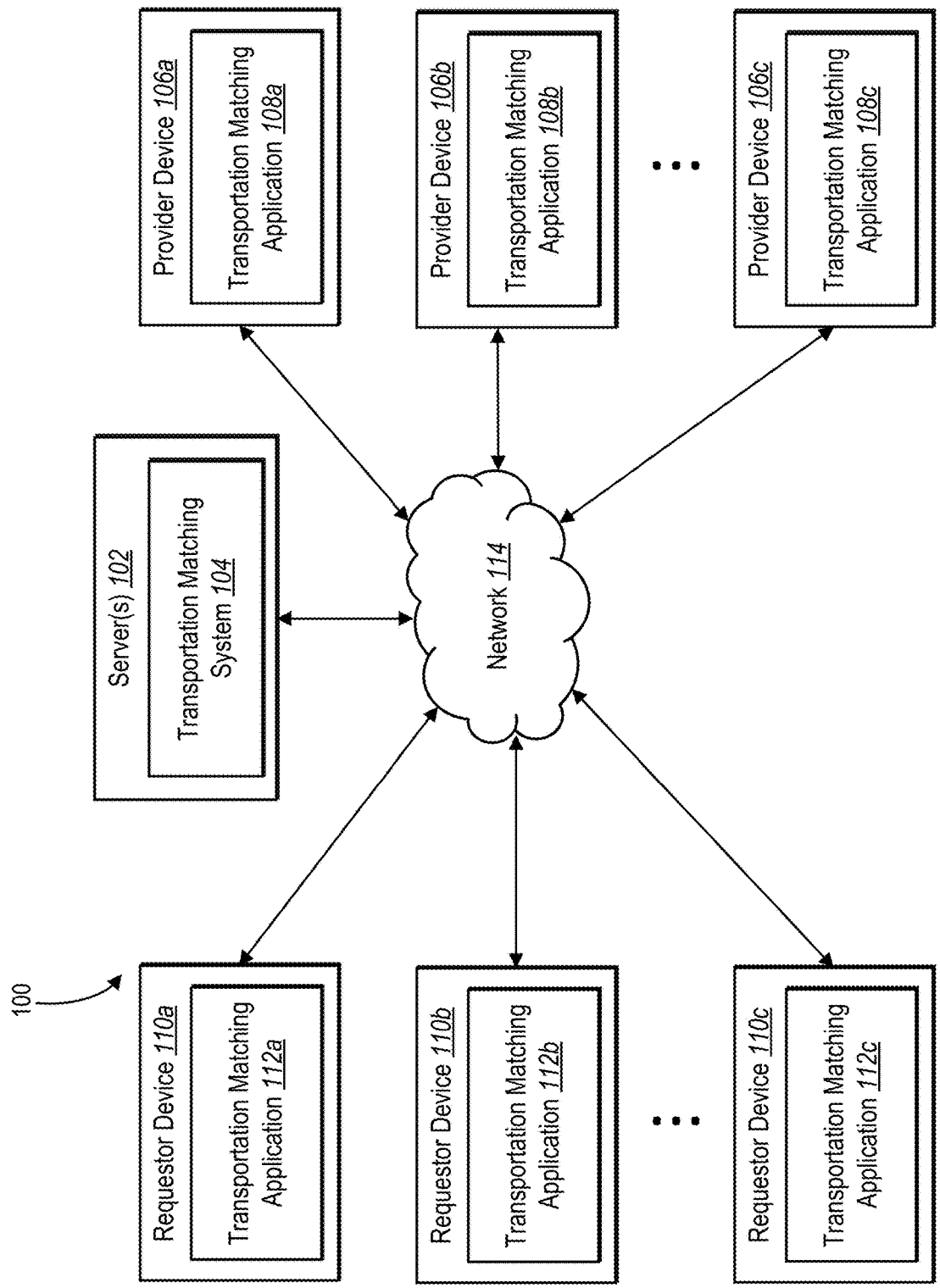
FIG. 1 illustrates a diagram of an environment in which a transportation matching system can operate in accordance with one or more embodiments.

This disclosure describes one or more embodiments of a transportation matching system that provides transportation graphical user interfaces with scheduled transportation options to requestor devices and dynamically monitors digital activity of requestor devices to generate transportation groups that satisfy arrival deadlines. To illustrate, in one or more embodiments, the transportation matching system provides graphical user interfaces that include both a current transportation request option and a scheduled transportation request option. Specifically, based on interaction with the scheduled transportation request option, the transportation matching system can dynamically provide various selectable timeslots for presentation to requestor devices including corresponding pick-up times, arrival deadlines for a selected destination, and transportation values. In some embodiments, based on receiving selection of a timeslot from a requestor device, the transportation matching system monitors digital activity (e.g., digital transportation requests) corresponding to other requestor devices and generates transportation groups. Specifically, the transportation matching system determines transportation groups for selected timeslots that satisfy arrival deadlines for each respective requestor device. By intelligently generating transportation groups based on selected timeslots from a variety of graphical user interfaces of various requestor devices, the transportation matching system can more flexibly generate transportation matches while improving the accuracy and efficiency of implementing computer systems.

As mentioned, in some embodiments, the transportation matching system provides a graphical user interface that includes a current transportation request option and a scheduled transportation request option. For example, the transportation matching system can determine a current transportation request option by identifying provider devices that are immediately available to provide transportation services for a requestor device. Thus, the current transportation request option can include a transportation vehicle, a transportation value, a pick-up time, etc. In one or more embodiments, the scheduled transportation request option reflects future timeslots for receiving transportation services. In particular, upon selection of the scheduled transportation request option, the transportation matching system can provide a plurality of timeslots for display (e.g., timeslots in 15 minute increments). Each of these timeslots can reflect a pick-up time with a corresponding arrival time and/or transportation value.

In some embodiments, the transportation matching system intelligently determines numbers and ranges of pick-up times for these timeslots. For example, based on historical request data corresponding to a geographical region, the transportation matching system can select timeslots that have different time ranges. In particular, the transportation matching system can analyze a volume of historical requests in a region to determine a number and duration of timeslots to provide within a graphical user interface. To illustrate, in a high density region with a large volume of historical requests, the transportation matching system can provide ten timeslots with pick-up times spaced fifteen minutes apart.

In addition to determining the number and duration of the timeslots, the transportation matching system can also analyze a transportation request to determine a destination arrival time (e.g., a guaranteed estimated time of delivery). For example, in some embodiments, the transportation matching system identifies a pick-up location and destination from the requestor device. After determining the timeslots based on the received pick-up location and destination, the transportation matching system can also determine routes to the destination from the pick-up location and times corresponding to the routes. The transportation matching system can apply a buffer and/or confidence value to the anticipated travel time in identifying the destination arrival time. To illustrate, in one or more embodiments, the transportation matching system determines a distribution of historical transportation times from the pick-up location to the destination utilizing the pick-up time range for a particular timeslot. In some embodiments, the transportation matching system applies a confidence threshold to the distribution of historical transportation times to determine an arrival deadline.

As mentioned, the transportation matching system can also determine transportation values corresponding to provided timeslots. The transportation matching system can determine transportation values based on anticipated travel distance/time, predicted number of requestor devices in a transportation group, and/or balance of requestor devices across time slots. For example, the transportation matching system can determine a balance of transportation requests among a set of timeslots to determine corresponding transportation values. To illustrate, in one or more embodiments, the transportation matching system determines a balance of predicted transportation requests in each timeslot relative to a predicted volume of provider devices available during each timeslot.

In some embodiments, the transportation matching system can modify elements within a graphical user interface to guide requestor devices to select particular timeslots. Indeed, as just mentioned the transportation matching system can monitor balances of transportation requests within particular timeslots. Specifically, the transportation matching system can determine timeslots that are under-utilized or over-saturated. The transportation matching system can determine transportation modifiers based on these balance metrics and modify graphical user interfaces according to the transportation modifiers. For example, the transportation matching system 104 can apply a transportation modifier to adjust the color, size, or transportation value of a particular timeslot within a graphical user interface of a requestor device. The transportation matching system can also modify the timeslots in real-time (e.g., by continuously monitoring received transportation requests and selected timeslots across requestor devices).

As mentioned above, the transportation matching system can also monitor digital activity of requestor devices to determine transportation groups. For example, in some embodiments, the transportation matching systems isolates a set of requestor devices (e.g., based on the geographical area, pick-up location, and destination corresponding to a transportation request). The transportation matching system can then analyze the set of requestor devices to generate a transportation group. For example, the transportation matching system can apply a cost function to a set of requestor devices to generate one or more transportation groups. More specifically, in some embodiments, the transportation matching system applies the cost function to identify transportation groups that minimize a cost metric subject to a constraint of satisfying each arrival deadline within the transportation group.

Additionally, in some embodiments, the transportation matching system applies the cost function to the set of requestor devices further subject to a time-dependent threshold. In one or more embodiments, the time-dependent threshold represents a threshold value metric for a transportation group. Additionally, in some embodiments, the transportation matching system automatically increases the time-dependent threshold for a transportation group as the date(s) and time(s) associated with the set of requestor devices comes closer to the present date and time. Accordingly, in one or more embodiments, the transportation matching system iteratively applies the cost function to a set of requestor devices to determine a value metric for the transportation group and compares the value metric to the time-dependent threshold. If the value metric satisfies the time-dependent threshold, the transportation matching system can generate the transportation group and dispatch a provider device to provide transportation services for the transportation group. If the value metric does not satisfy the time-dependent threshold, the transportation matching system can search and/or wait to identify a more efficient transportation group.

Also, in one or more embodiments, the transportation matching system generates a transportation group by generating a route for servicing transportation requests corresponding to the transportation group. More specifically, the transportation matching system can match requestor devices to a transportation group by determining that estimated arrival times for a determined route servicing each requestor device satisfy arrival deadlines associated with each requestor device. Further, the transportation matching system can utilize a confidence threshold to determine that the estimated arrival times will satisfy the arrival deadlines.

Additionally, in some embodiments, the transportation matching system generates and provides a walking component as part of a scheduled transportation request. In particular, the transportation matching system can identify drop-off walking opportunities, which are used to adjust transportation value and wells as determine arrival times. In addition, the transportation matching system can determine a walking efficiency metric corresponding to an identified walking component. Further, in some embodiments, the transportation matching system determines whether the determined walking efficiency metric satisfies a walking efficiency threshold. In response to determining that the walking efficiency metric satisfies the walking efficiency threshold, the transportation matching system can provide an option including the walking component to the requestor device.

As briefly mentioned above, a number of technical problems exist with conventional transportation systems, particularly in flexibility, accuracy, and efficiency of operation. To illustrate, some conventional transportation systems match requestor devices and provider devices immediately or almost immediately after receiving a transportation request. This rigid approach limits conventional systems to inflexibly considering requestor devices and provider devices from a small pool that are immediately available. Accordingly, conventional systems rigidly analyze a small pool of requestor devices and provider devices in generating transportation matches and arranging transportation services.

Accordingly, many conventional systems also suffer from problems with inaccuracy. For example, conventional systems often attempt to generate transportation matches with one provider devices and multiple requestor devices. In doing so, such conventional systems will undermine the accuracy of estimated destination arrival times provided via graphical user interfaces of requestor devices. Indeed, during transportation of a first requestor device, conventional systems will often add a requestor device to the transportation service that requires significant detours and significantly delay the arrival time of the first requestor device. This unreliability in predicting an arrival time for a transportation request can prohibit conventional transportation systems from being able to plan or schedule ahead for transportation requests. Additionally, the unpredictability in time of arrival at a destination can cause users to migrate to alterative systems.

Further, conventional systems also face significant efficiency problems with regard to implementing computing devices. To illustrate, many conventional systems match provider devices and requestor devices immediately (or near-immediately) after receiving a transportation request. By matching requestor devices and provider devices utilizing only immediately available information on immediately available devices, conventional systems often make inefficient matches that require excessive travel time and/or wait time. This additional time translates to additional and excessive network bandwidth and utilization of computational resources. Indeed, each additional minute of inefficient time translates to multiple different queries from requestor devices (e.g., updates regarding provider device locations, duplicate digital transportation requests, queries regarding other transportation options, etc.), and provider devices (e.g., navigational queries, queries regarding alternative pickup options, etc.). Moreover, excessive travel/waiting time often results in additional digital cancellations, which leads to duplicate network traffic and computational processing (e.g., additional requests from requestor devices, communication with provider devices, and server resources in identifying duplicate matches and coordinating transportation services).

Conventional systems are also inefficient in that they require excessive user interactions and time at requestor devices. For example, conventional systems often display limited transportation options to a requestor device. These limited options often require users to multiply digital transmissions and user interactions leading to inefficiencies in utilization of computer processing resources. For example, utilizing conventional systems, a requestor device that seeks to initiate a transportation request at a later time must either repeatedly check a transportation application for provider devices that will arrive at the later time or interact with a variety of additional user interfaces to submit a request for a later digital transportation request.

Some transportation systems (such as mass transit systems) seek to address these problems by providing a predetermined schedule of transportation services that are provided at regular intervals. Although this approach can lead to available transportation services, this approach undermines flexibility, accuracy, and efficiency. For example, mass transportation services provide vehicles (e.g., buses, trains, etc.) on rigid, regular scheduled time intervals even when there is no need for a transportation vehicle. Similarly, even though transportation services come at regular times utilizing mass transit schedules, such times often fail to align to the needs of individual passengers (e.g., passengers wait an undue and unnecessary length of time and do not have an option for immediate transport). Furthermore, such services often require passengers to travel to common pick-up locations (e.g., a bus stop or train station). The need to travel to a common pick-up location often undermines the ability or need to utilize the proffered transportation services in the first instance. In addition, mass transportation services are notorious for the inaccuracy of predicted arrival times, which undermines the ability for individual users to rely on provided services.

The transportation matching system provides solutions to a number of these technical problems. For example, the transportation matching system improves flexibility of implementing computing systems. Indeed, by providing a scheduled transportation request graphical user interface with a plurality of timeslots (and providing an arrive by time associated with a future time), the transportation matching system can significantly expand the pool of provider devices and requestor devices to analyze in generating transportation matches. For example, the transportation matching system flexibly analyze a variety of transportation requests for future timeslots to determine transportation groups that most efficiently align to pick-up locations and destinations. Thus, the transportation matching system is not limited to rigidly analyzing available provider devices and requestor devices immediately available but can generate transportation groups by analyzing requestor devices based on selected future timeslots.

In addition, the transportation matching system can improve accuracy relative to conventional systems. To illustrate, in one or more embodiments, the transportation matching system can generate transportation groups in advance (e.g., prior to picking up the first requestor device), and can avoid undermining accuracy of destination arrival times. In addition, the transportation matching system can generate and utilize a distribution of historical transportation times to the destination in conjunction with a confidence threshold and a buffer to determine an arrival deadline for a particular transportation request. Further, by utilizing the determined arrival deadline as a constraint when determining transportation groups, the transportation matching system consistently predicts and meets arrival deadlines. This improves accuracy of determining a time of arrival relative to conventional systems, which mitigates or eliminates user migration to alternate system.

Further, the transportation matching system improves accuracy in matching requestor devices to generate transportation groups. More specifically, in some embodiments, the transportation matching system utilizes a cost function subject to a time-dependent threshold to iteratively evaluate potential matches over time. For instance, the transportation matching system evaluates potential matches for requestor devices by dynamically modifying a time-dependent threshold as a pick-up time corresponding to a transportation request approaches. Thus, the transportation matching system improves accuracy of determined matches for provider devices by analyzing potential matches over time.

The transportation matching system also improves efficiency relative to conventional systems. More specifically, the efficiency metric matching system can reduce computing inefficiencies corresponding to unnecessary time. Indeed by providing additional transportation options with future timeslots, the efficiency metric matching system can generate transportation groups that significantly improve the efficiency of each individual ride, significantly lower transportation/wait times, and significantly reduce unnecessary communications bandwidth, queries, and processing resources. Furthermore, the efficiency metric matching system can significantly reduce the number of digital rejections and/or cancellations from requestor devices and provider devices, which further reduces the numbers of queries, status update requests, and other digital communication that strain network bandwidth and processing resources. In addition, by reducing cancellations, the efficiency metric matching system can further improve utilization of computational resources required to determine transportation matches by avoiding duplicate and unnecessary computer matching processes.

The transportation matching system can also improve efficiency by providing improved, more efficient graphical user interfaces. Indeed, the transportation matching system can provide graphical user interfaces that include both current transportation request options and scheduled transportation request options. Thus, requestor devices can efficiently generate transportation requests for a variety of different transportation approaches with minimal user interaction. Indeed, as discussed in greater detail below, the transportation matching system can generate an efficient transportation group that will arrive at a destination location within a guaranteed arrival time based on a minimal set of user interactions (e.g., two clicks) from a requestor device. In this manner, the transportation matching system can significantly reduce time, user interactions, and processing power.

Furthermore, the transportation matching system improves flexibility, accuracy, and efficiency relative to conventional mass transit systems. Indeed, the transportation matching system can flexibly provide current transportation request options and scheduled transportation request options. Moreover, the transportation matching system can flexibly dispatch provider devices based on actual transportation requests (thus avoiding wasted resources). Furthermore, the transportation matching system can generate transportation groups to accurately provide transportation resources with commensurate transportation requests. Moreover, the transportation matching system can fulfill transportation requests for transportation groups while satisfying arrival times provided via graphical user interfaces. In short, the transportation matching system can provide technical improvements relative to conventional matching systems and conventional mass transit systems.

As illustrated by the foregoing discussion, the present disclosure utilizes a variety of terms to describe features and advantages of the transportation matching system. Additional detail is now provided regarding the meaning of such terms. For example, as used herein, the term provider device" refers to a computing device associated with a transportation provider and/or transportation vehicle. Similarly, the term "requestor device" refers to a computing device associated with a transportation requestor. The transportation matching system can match provider devices to requestor devices and requestor devices to other requestor devices based on a variety of criteria.

Additionally, as used herein, the term "current transportation request option" refers to a selectable option in a graphical user interface to request immediate (or near immediate) transportation services (e.g., a request for transportation services as soon as possible). In particular, the term "current transportation request option" can include a selectable option within a graphical user interface that when selected, causes a system to search for a provider device to provide transportation services at a current time instance. Similarly, as used herein, the term "scheduled transportation request option" refers to a selectable option in a graphical user interface to request transportation at a selected date and/or time in the future. In particular, the term "scheduled transportation request option" can include a selectable option within a graphical user interface that when selected, causes a system to search for a provider device to provide transportation services at a later scheduled time (e.g., within a future time window or timeslot).

Also, as used herein, the term "timeslot" refers to a range of time. In particular, the term "timeslot" can include a selectable option corresponding to a transportation request within a range of time (e.g., a transportation request form a particular pick-location to a particular destination within a range of time). To illustrate, a timeslot can include a range of pick-up times for a scheduled transportation request and a corresponding arrival deadline and transportation values for the transportation request during that range of pick-up times.

Additionally, as used herein, the term "pick-up time" refers to a time or range of times for a provider device to pick up a requestor device. In particular, the term "pick-up time" can include an estimated time of arrival of a provider device to a pick-up location and/or a range of times that a provider device may arrive at a pick-up location. To illustrate, a pick-up time can include a time or range of times generated (e.g. partitioned) by the transportation matching system based on historical transportation request data.

Further, as used herein, the term "arrival deadline" refers to a time before which requestor device will arrive at a destination. In particular, the term "arrival deadline" can include a time (selected via a requestor device) specifying the latest time at which a provider device should transport a requestor device to a destination. To illustrate, an arrival deadline can include the latest time at which a scheduled transportation request is completed.

Also, as used herein, the term "transportation value" refers to a metric reflecting the value of a transportation request. In particular, the term "transportation value" can include a cost, fee, payment, or other measure of value corresponding to a transportation request. To illustrate, a transportation value can include a price corresponding to a transportation request.

Additionally, as used herein, the term "transportation modifier" refers to a modification corresponding a transportation option. In particular, a transportation modifier can include a metric by which to modify or change an aspect of a transportation option. To illustrate, a transportation modifier can include a color modifier, a size modifier, or a transportation value modifier.

Further, as used herein, the term "digital activity" refers to actions of a user device. In particular, the term "digital activity" can include user interactions or processes on a requestor device related to digital transportation requests. To illustrate, a digital activity can include requestor selection of transportation options, including pick-up location, destination, timeslot, pick-up time, arrival deadline, and/or transportation values.

Additionally, as used herein, the term "transportation group" refers to a set of requestor devices selected to share transportation services. In particular, the term "transportation group" can include requestor devices matched for a shared ride to service multiple corresponding transportation requests to satisfy all corresponding arrival deadlines. To illustrate, a transportation group can include matched requestor devices matched by applying a cost function to a set of requestor devices subject to a constraint of satisfying each arrival deadline.

Further, as used herein, the term "balance of transportation requests" refers to a current and/or historical distribution of transportation requests (e.g., between timeslots). In particular, the term "balance of transportation requests" can include a number of transportation requests scheduled in one timeslot relative to a threshold or a number of transportation requests scheduled in another timeslot. To illustrate, a balance of transportation requests can include a comparison of numbers of transportation requests relative to an anticipated number of provider devices during various timeslots.

Also, as used herein, the term "cost function" refers to a computer-implemented algorithm that assigns cost metrics to certain outcomes or results (and modifies variables to reduce the cost metrics). In particular, the term "cost function" can include a computer-implemented algorithm that assigns costs to characteristics corresponding to a transportation group and selects requestor devices to join the transportation group based on the cost metrics (e.g., to minimize the cost metrics).

Additionally, as used herein, the term "distribution of historical transportation times" refers to data from past transportation requests. In particular, the term "distribution of historical transportation times" can include historical data regarding the range and frequency of transportation times from a pick-up location to a destination. To illustrate, in one or more embodiments, the transportation matching system can utilize a distribution of historical transportation times (e.g., a normal distribution) to determine predicted transportation times for future transportation requests, and a confidence value corresponding to the predicted transportation times.

Further, as used herein, the term "confidence threshold" refers to a threshold measure corresponding to the certainty of a prediction. In particular, the term "confidence threshold" can include a threshold value representing a sufficient confidence value. For example, the confidence threshold can represent a sufficient confidence in satisfying an arrival deadline. To illustrate, a confidence threshold can include a threshold value of 90% certainty, 95% certainty, etc. (e.g., a certain number of standard deviations or an alpha value of a Gaussian distribution). Relatedly, as used herein, the term "confidence arrival deadline" refers to an arrival deadline determined by applying a confidence threshold to a distribution of historical transportation times.

Similarly, a "time-dependent threshold" refers to a threshold measure that changes over time. In particular, the term "time-dependent threshold can include a threshold measure that changes based on time remaining before a pick-up and/or drop-off time corresponding to a transportation request. In one or more embodiments, the transportation matching system utilizes a time-dependent threshold to generate transportation groups based on the value gained from matching requestor devices relative to time left before the transportation requests.

Also, as used herein, the term "walking component" refers to a portion of a transportation request involving walking. In particular, the term "walking component" can include a portion of a transportation request route for which the transportation matching system prompts a requestor device to walk to a pick-up location and/or to a destination from a drop-off location. Relatedly, as used herein, the term "walking efficiency metric" refers to a metric reflecting the value or efficiency of a walking component. In particular, the term "walking efficiency metric" can include a value and/or efficiency to the transportation matching system gained by utilizing a walking component in a transportation request.

Further, as used herein, the term "walking efficiency threshold" refers to a benchmark walking efficiency metric. In particular, the term "walking efficiency threshold" can include a benchmark walking efficiency metric at which the transportation matching system will include a corresponding walking component in a transportation option.

Additional detail will now be provided in relation to illustrative figures portraying example embodiments and implementations of the transportation matching system. For example, FIG. 1 illustrates a computing system environment (or "system") 100 for implementing a transportation matching system in accordance with one or more embodiments. As shown in FIG. 1, the system 100 includes server(s) 102, a transportation matching system 104, provider devices 106a-106n, requestor devices 110a-110n, and a network 114. Each of the components of the system 100 can communicate via the network 114, and the network 114 may be any suitable network over which computing devices can communicate. Example networks are discussed in more detail below in relation to FIG. 11.

As shown in FIG. 1, the system 100 includes the provider devices 106a-106n (collectively, the provider devices 106). Similarly, the system 100 includes the requestor devices 110a-110n (collectively, the requestor devices 110). The provider devices 106 and the requestor devices 110 can each be one of a variety of computing devices, including a smartphone, tablet, smart watch, smart television, desktop computer, laptop computer, virtual reality device, augmented reality device, or other computing device as described in relation to FIG. 11. Furthermore, FIG. 1 illustrates multiple provider devices 106 and multiple requestor devices 110. However, in some embodiments the system 100 can include a single provider device 106 and/or a single requestor device 110.

In addition, the provider devices 106 and the requestor devices 110 can further communicate with the server(s) 102, including the transportation matching system 104, via the network 114. For example, in response to transportation requests from the requestor devices 110, the transportation matching system 104 can communicate with the provider devices 106 and/or the requestor devices 110 via the network 114 to provide various communications. For example, the transportation matching system 104 can match provider devices and requestor devices in providing transportation services. Moreover, as discussed above, the transportation matching system 104 provides timeslots and corresponding pick-up times, arrival deadlines, and transportation values via the network 114. Additionally, the provider devices 106 can send detected provider device input, including selection of timeslots and other transportation options, to the server(s) 102 and the transportation matching system 104 via the network 114.

In one or more embodiments, the provider devices 106 and the requestor devices 110 correspond to one or more user accounts (e.g., user accounts stored at the server(s) 108). For example, a user of a provider device can establish a user account with login credentials and a provider of the provider device can establish a provider account with login credentials. The transportation matching system 104 can manage provider devices 106 and the requestor devices 110 based on appropriate privileges associated with the corresponding user accounts (e.g. provider accounts and/or requestor accounts). Accordingly, providers and/or requestors can utilize multiple devices (e.g., multiple provider devices or multiple requestor devices) with the appropriate privileges associated with the corresponding accounts. The present disclosure utilizes provider devices and requestor devices to refer to devices associated with these user accounts. Thus, in referring to a provider device or a requestor device, the disclosure and the claims are not limited to communications with a specific device, but any device corresponding to an account of a particular user. Accordingly, in using the term provider device, this disclosure refers to any computing device corresponding to a provider account. Similarly, in using the term requestor device, this disclosure refers to any computing device corresponding to a requestor account.

As shown, each of the provider devices 106 and the requestor devices 110 include corresponding transportation matching applications 108a-108n and 112a-112n, respectively. In particular, the transportation matching applications 108a-108n and 112a-112n (collectively, applications 108 and applications 112, respectively) may be a web application, a native application installed on the provider devices 106 and the requestor devices 110 (e.g., a mobile application, a desktop application, etc.), or a cloud-based application where part of the functionality is performed by the server(s) 102. The applications 108 and the applications 112 can present or display information to users respectively associated with the provider devices 106 and the requestor devices 110, including timeslots, requestor device matches, provider device matches, etc. As an example, the transportation matching application 108a can cause the provider device 106a to communicate with the transportation matching system 104 for selecting a transportation time block based on requestor interaction with selectable elements in a graphical user interface.

As illustrated in FIG. 1, the system 100 includes the server(s) 102. The server(s) 102 may execute, generate, store, receive, and transmit electronic data, such as executable instructions for providing a graphical user interface for selecting transportation request options. For example, the server(s) 102 may receive transportation requests, including selection of timeslots, from requestor devices 110. In turn, the server(s) 102 can transmit data associated with the transportation requests to one or more components in the system 100. In one or more embodiments, the server(s) 102 can provide notifications of requestor device matching and provider device matching to the requestor device(s) 110 and/or the provider devices 106. Additionally, the server(s) 102 may send information for a first graphical user interface for selecting pick-up locations and destinations and/or a scheduled transportation graphical user interface for selecting timeslots.

Although FIG. 1 depicts the transportation matching system 104 located on the server(s) 102, in some embodiments, the transportation matching system 104 may be implemented by one or more other components of the system 100 (e.g., by being implemented entirely or in part at one or more of the other components). For example, the transportation matching system 104 may be implemented in whole, or in part, by the provider devices 106 and/or the requestor devices 110. Additionally, although not illustrated in FIG. 1, in some embodiments, the system 100 may have a different arrangement of components and/or may have a different number or set of components altogether.

Figure 2:
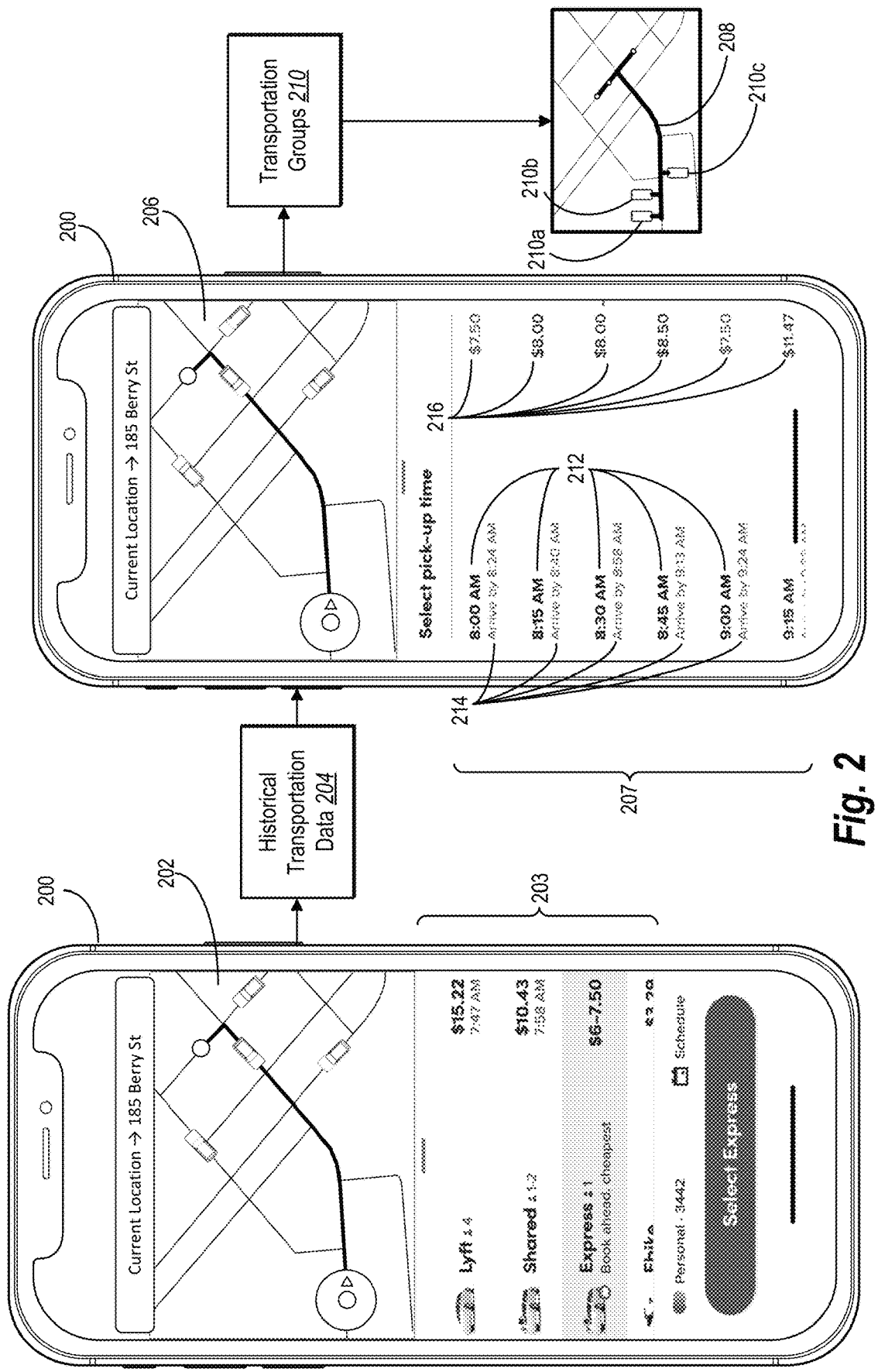
FIG. 2 illustrates an overview of a process for matching requestor devices into transportation groups in accordance with one or more embodiments.

As mentioned above, in one or more embodiments, the transportation matching system 104 matches requestor devices to generate transportation groups. FIG. 2 illustrates an overview of providing timeslots and generating transportation groups in accordance with one or more embodiments. As shown in FIG. 2, the requestor device 200 displays the first graphical user interface 202. As will be discussed in greater detail with regard to FIG. 3A, the first graphical user interface 202 includes various selectable transportation options 203, including a current transportation request option and a scheduled transportation request option.

In one or more embodiments, the transportation matching system 104 receives requestor selection of the scheduled transportation request option via the first graphical user interface 202. In response to receiving requestor selection of the scheduled transportation request option, in some embodiments, the transportation matching system 104 utilizes historical transportation data 204 to generate timeslots corresponding to a pick-up location and destination received via the first graphical user interface 202. More specifically, as shown in FIG. 2, the transportation matching system 104 generates timeslots 207 for the scheduled transportation request graphical user interface 206.

Figure 3A:
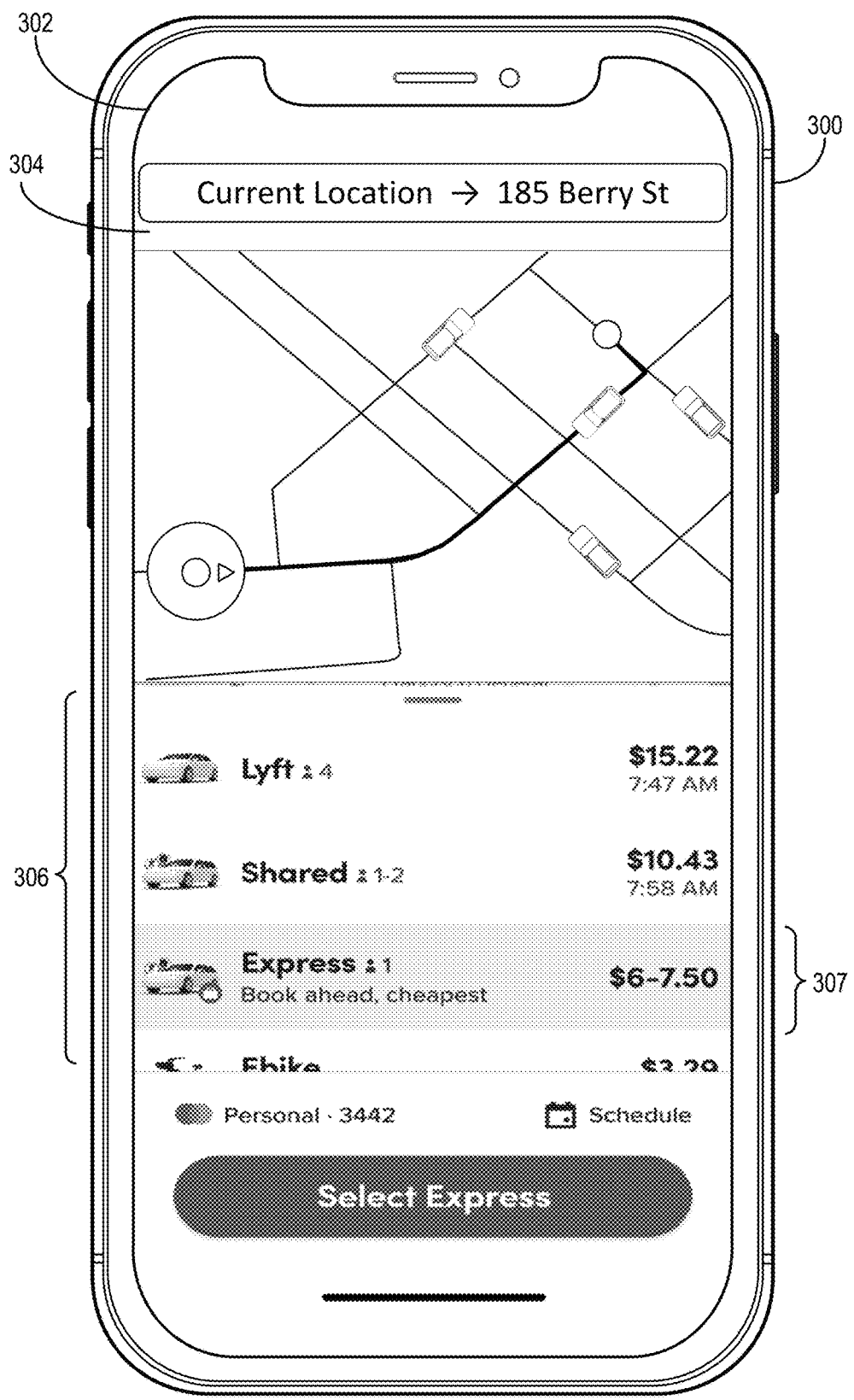
FIGS. 3A-3C illustrate graphical user interfaces for selection and specification of scheduled transportation request options in accordance with one or more embodiments.

As will be discussed in greater detail below with regard to FIGS. 3A-3C, in one or more embodiments, the transportation matching system 104 utilizes historical transportation data to generate timeslots, including pick-up times, arrival deadlines at the selected destination, and transportation values. More specifically, in some embodiments, the transportation matching system 104 identifies historical volume of transportation requests, historical volume of provider devices, historical transportation times, and historical transportation values from similar times at the geographical location. As shown in FIG. 2, the transportation matching system 104 utilizes this variety of historical transportation data 204 to generate the timeslots 207 for presentation in the scheduled transportation request graphical user interface 206.

In one or more embodiments, the transportation matching system 104 generates pick-up times 212 for the timeslots 207 by partitioning time periods based on historical transportation request data. More specifically, in some embodiments, the transportation matching system 104 identifies a historical volume of transportation requests and a historical volume of provider devices for a geographical region at similar dates and/or times. To illustrate, the transportation matching system 104 utilizes the historical volume of transportation requests to predict future volumes of transportation requests and future volumes of provider devices in the geographical region. In one or more embodiments, the transportation matching system 104 partitions time periods to pick-up time ranges for the timeslots 207 based on a predicted volume of transportation requests relative to a predicted volume of provider devices.

As shown in FIG. 2, the transportation matching system 104 also generates the timeslots 207 including arrival deadlines 214. More specifically, the transportation matching system 104 generates the arrival deadlines 214 based on a pick-up location and a destination received via the first graphical user interface 202. To illustrate, in some embodiments, the transportation matching system 104 generates a distribution of historical transportation times from the pick-up location to the destination. Further, in one or more embodiments, the transportation matching system 104 applies a confidence threshold to the distribution of historical transportation times from the pick-up location to the destination to determine the arrival deadline. Thus, the transportation matching system 104 determines a confidence arrival deadline with known confidence based on the distribution of historical transportation times. Further, in one or more embodiments, the transportation matching system 104 applies a buffer to the confidence arrival deadline to generate the arrival deadlines 214.

As also shown in FIG. 2, the transportation matching system 104 generates the timeslots 207 including transportation values 216 and/or transportation modifiers. To illustrate, in one or more embodiments, the transportation matching system 104 generates the transportation values 216 based on a balance of predicted transportation requests in each of the timeslots 207 relative to a predicted volume of provider devices available during each timeslot. In some embodiments, the transportation matching system 104 also dynamically updates transportation values based on continuously updating currently scheduled transportation requests in various timeslots.

Further, as shown, the transportation matching system 104 determines and applies transportation modifiers to some or all of the transportation values 216. In some embodiments, the transportation matching system 104 utilizes transportation modifiers to modify the presentation of the transportation values 216. For example, the transportation matching system 104 applies transportation modifiers to change the size, color, font, or other presentation of transportation values. Additionally, in some embodiments, the transportation matching system 104 utilizes a transportation modifier to modify the transportation value itself. For example, the transportation matching system 104 determines a transportation modifier as a metric to be applied to one or more transportation values.

As shown in FIG. 2, the transportation matching system 104 provides the generated timeslots 207 including corresponding pick-up times 212, arrival deadlines 214 at the destination, and transportation values 216 for presentation in the scheduled transportation request graphical user interface 206. More specifically, in some embodiments, the transportation matching system 104 provides the scheduled transportation request graphical user interface 206 including the timeslots in response to receiving a user selection of a scheduled transportation request option. Further, as shown in FIG. 2, the transportation matching system 104 provides the timeslots as selectable options for completing a transportation request.

Additionally, as shown in FIG. 2, the transportation matching system 104 generates transportation groups 210. More specifically, in one or more embodiments, the transportation matching system 104 generates the transportation groups 210 by monitoring digital activity of requestor devices, including user selection of the timeslots 207. Further, the transportation matching system 104 can monitor the positions of requestor devices utilizing global positioning systems of requestor devices. Additionally, the transportation matching system 104 can determine geographical regions corresponding to requestor devices based on monitored global positioning system data.

As will be discussed in greater detail below with regard to FIG. 6A, in some embodiments, in response to receiving user selection of a timeslot, the transportation matching system 104 analyzes the user selections of a pick-up location, destination, and from the timeslots 207 to assign the requestor device to a set of requestor devices. In one or more embodiments, the transportation matching system 104 buckets requestor devices into sets of requestor devices by determining compatibility between requestor devices based on pick-up locations, destinations, and timeslots corresponding to transportation requests.

Further, as will be discussed in greater detail below with regard to FIGS. 6A-6B, in some embodiments the transportation matching system 104 generates the transportation groups 210 by applying a cost function to a set of requestor devices. More specifically, the transportation matching system 104 can apply a cost function subject to a constraint of satisfying corresponding arrival deadlines 214 to match requestor devices into transportation groups. In some embodiments, the transportation matching system 104 generates a route for a potential transportation group in order to determine that an estimated arrival time for the route satisfies an arrival deadline. Thus, the transportation matching system 104 provides efficient matches that maximize value to the transportation matching system 104 while satisfying selected arrival deadlines.

Accordingly, as shown in FIG. 2, the transportation matching system 104 generates the route 208 for a transportation group of the transportation groups 210. The route 208 includes three requestor devices 210a-210c corresponding to three transportation requests. However, the transportation matching system 104 determines the route 208 for a single provider device to service all three requestor devices based on application of the cost function subject to the constraint of satisfying arrival deadlines associated with the transportation requests.

As discussed above, in some embodiments the transportation matching system 104 provides various graphical user interfaces to requestor devices for selection of various transportation options for a scheduled transportation request. For example, FIG. 3A illustrates a requestor device 300 presenting a graphical user interface 302. The first graphical user interface 302 includes various selectable options for generating a transportation request.

For example, the transportation matching system 104 includes the pick-up location and destination bar 304. The transportation matching system 104 receives user selection of a pick-up location and a destination for a transportation request at the pick-up location and destination bar 304. As shown in FIG. 3A, the pick-up location and destination bar 304 includes a pick-up location of the "Current location" of the requestor device. Additionally, the pick-up location and destination bar 304 includes a destination of "185 Berry St." However, in one or more embodiments, the transportation matching system 104 receives a variety of pick-up locations and destinations at the pick-up location and destination bar 304.

Based on receiving user interaction selecting a pick-up location and destination at the pick-up location and destination bar 304, the transportation matching system 104 can generate and provide the transportation options area 306. As shown in FIG. 3A, the transportation options area 306 includes a current transportation option labelled "Lyft," a current transportation option labelled "Shared," and a scheduled transportation option 307 labelled "Express." In one or more embodiments, the scheduled transportation option 307 corresponds to a shared transportation request (i.e., the scheduled transportation option 307 indicates that the requestor device/requestor is willing to share transportation services with another requestor device/requestor). However, it will be appreciated that in one or more embodiments, the transportation matching system 104 generates and provides a variety of current transportation options and scheduled transportation options with a variety of labels.

The scheduled transportation option 307 includes a range of transportation values "$6-7.50." In one or more embodiments, the transportation matching system 104 determines a range of transportation values corresponding to the scheduled transportation option 307 based on a range of transportation values corresponding to different timeslots. To illustrate, in some embodiments, the transportation matching system 104 generates transportation values for a variety of timeslots for the received pick-up location and drop-off location. In one or more embodiments, the transportation matching system 104 identifies the lowest transportation value corresponding to a timeslot and the highest transportation value corresponding to a timeslot to determine a range of transportation values. Thus, as shown in FIG. 3A, the transportation matching system 104 provides the range of transportation values as part of the scheduled transportation option 307.

Figure 3B:
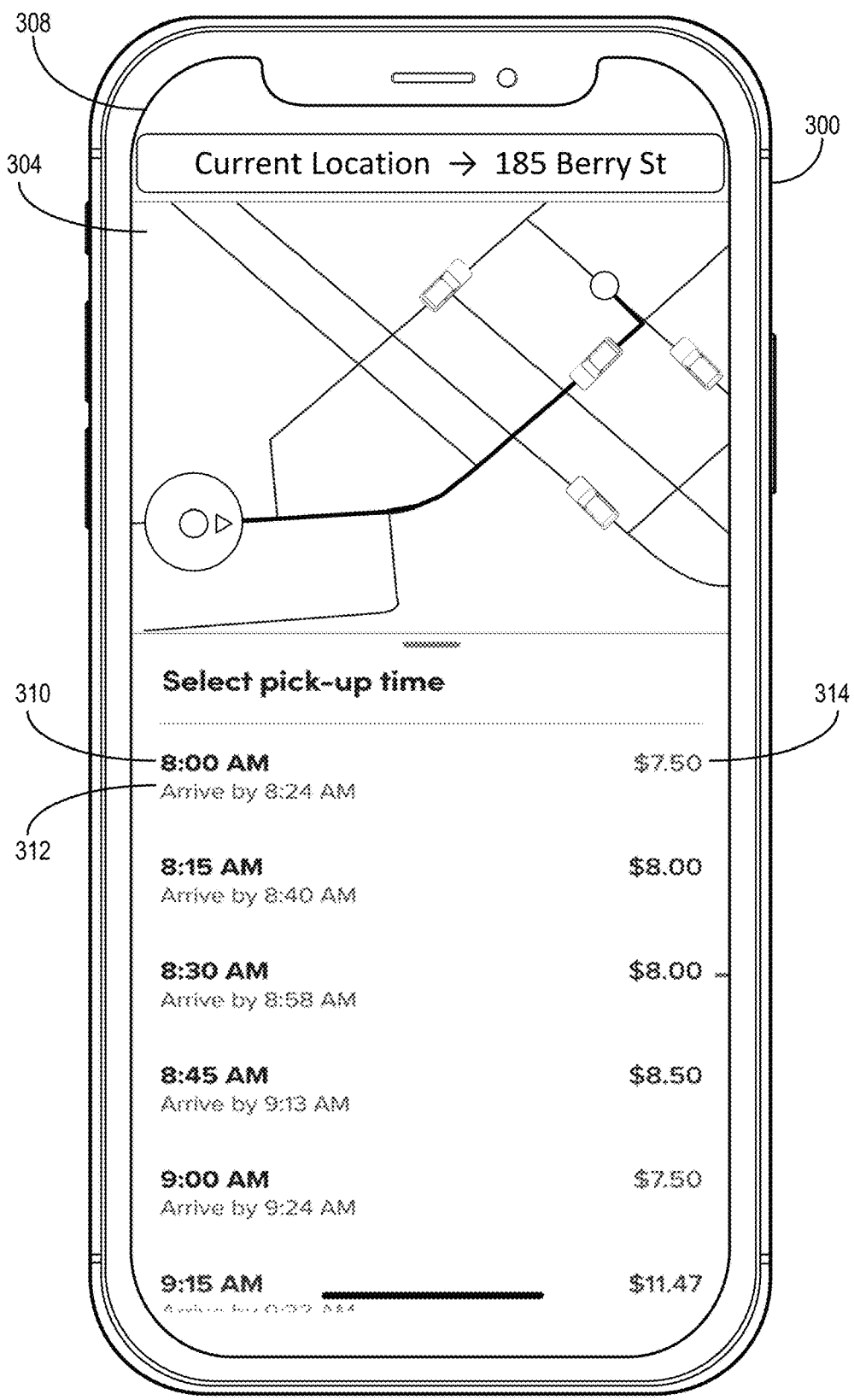
Figure 3C:
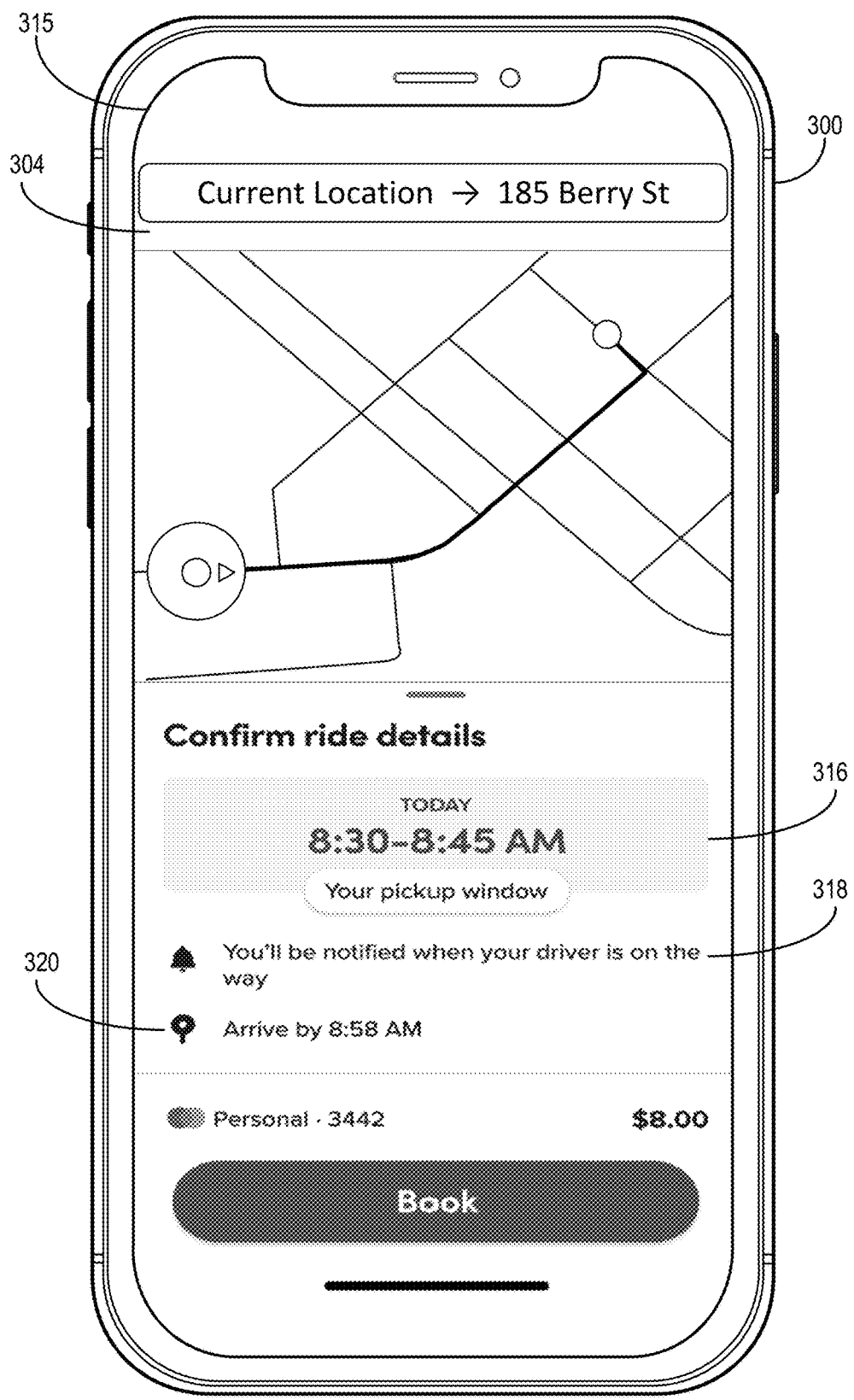

As shown in FIG. 3B, in response to receiving user selection of the scheduled transportation option 307, the transportation matching system 104 provides, and the requestor device 300 presents, a scheduled transportation request graphical user interface 308. FIG. 3B illustrates the scheduled transportation request graphical user interface 308 including a variety of timeslots. More specifically, the scheduled transportation request graphical user interface 308 includes a pick-up time 310, an arrival deadline 312, and a transportation value 314.

As discussed briefly above, in one or more embodiments, the transportation matching system 104 generates timeslots utilizing historical transportation data. More specifically, in some embodiments the transportation matching system 104 organize a future time period into timeslots with pick-up times based on a predicted volume of transportation requests relative to a predicted volume of provider devices during the time period. For example, the transportation matching system 104 identifies similar dates and/or times to the future time period at a geographical region. The transportation matching system 104 can utilize calendar information and any received information about the future time period. The transportation matching system 104 can utilize weather, traffic, and/or event information. For example, the transportation matching system 104 can identify previous Thursday mornings as similar to a future Thursday night, prior Mother's Day Sundays as similar to a future Mother's Day Sunday, and/or can identify a pervious date with a similar event and weather to an event and weather of a future date.

In some embodiments, the transportation matching system 104 utilizes historical volumes of transportation requests on the similar dates and/or times to determine a predicted volume of transportation requests during the future time period. Similarly, the transportation matching system 104 can utilize historical volumes of provider devices servicing in the geographical region on the similar dates and/or times to determine a predicted volume of provider devices servicing in the geographical region for the future time period. Accordingly, in one or more embodiments, the transportation matching system 104 utilizes the predicted volume of transportation requests during the future time period relative to the predicted volume of provider devices servicing in the geographical region for the future time period to determine a number of timeslots for the period of time.

In some embodiments, the transportation matching system 104 can utilize partition the timeslots based on a maximum anticipated predicted volume of transportation requests for a single timeslot during the future time period. In one or more embodiments, the transportation matching system 104 can utilize the predicted volume of provider devices servicing in the geographical region to determine the partition. For example, if the transportation matching system 104 determines (e.g. based on available provider devices, traffic conditions, etc.) that each timeslot between 9:00 am-10:00 am in a particular location should include 20 transportation requests. Thus, if the transportation matching system 104 determines a predicted volume of transportation requests at 100 per hour, the transportation matching system 104 can partition the hour into five timeslots at twelve minute increments. In another example, if the transportation matching system 104 determines a predicted volume of transportation requests at 160 per hour, the transportation matching system 104 can partition the hour into eight timeslots at 7.5 minute increments. Similarly, if the transportation matching system 104 determines a predicted volume of 40 requests per hour, the transportation matching system 104 can partition the hour into two (30 minute) timeslots.

As shown in FIG. 3B, the scheduled transportation request graphical user interface 308 includes timeslots fifteen minutes apart. To illustrate, the pick-up time 310 includes "8:00 AM." In one or more embodiments, the pick-up time 310 includes a range of pick-up times from 8:00 AM to 8:15 AM. However, the transportation matching system 104 can implement a variety of pick-up times for a variety of ranges. The transportation matching system 104 can generate and implement a pick-up time range from the beginning of one timeslot to the beginning of the next timeslot. In addition or in the alternative, the transportation matching system 104 can utilize pick-up time ranges of fixed length. For example, the transportation matching system 104 can implement a timeslot every five minutes with pick-up time ranges of ten minutes each.

As will be discussed in greater detail with regard to FIG. 4, the transportation matching system 104 can determine the arrival deadline 312 utilizing a distribution of historical transportation times. As shown in FIG. 3B, the transportation matching system 104 can determine a distribution of historical transportation times from the current location of the requestor device 300 to 185 Berry St. with a pick-up time between 8:00 am and 8:15 am. Accordingly, the transportation matching system 104 determines the arrival deadline 312 by applying a confidence threshold to the distribution of historical transportation times.

In addition to determining arrival deadlines, in one or more embodiments, the transportation matching system 104 can determine one or more actions to take in the event that the arrival deadline is not met. For example, the transportation matching system 104 can provide a full or partial refund for the price of the transportation request based on determining that drop-off at the destination occurred after the arrival deadline. In one or more embodiments, the transportation matching system 104 can provide information about the actions when providing the arrival deadline and/or after determining that the arrival deadline was not met.

Further, in some embodiments, the transportation matching system 104 can provide the arrival deadline to requestor devices without association with a timeslot. To illustrate, the transportation matching system 104 can provide the determined arrival deadline to the requestor device associated with a percent certainty and/or a guarantee to meet the arrival deadline. Thus, the transportation matching system 104 can provide and meet the determined arrival deadlines with or without association with a timeslot and/or with a shared transportation request.

In response to selection of a timeslot, the transportation matching system 104 can provide one or more user interfaces to confirm selected information. For example, as shown FIG. 3C, the transportation matching system 104 can provide, and the requestor device 300 can present, a confirmation graphical user interface 315. In one or more embodiments, the transportation matching system 104 provides the confirmation graphical user interface 315 in response to receiving user selection of a timeslot via the scheduled transportation request graphical user interface 308. FIG. 3C illustrates that the confirmation graphical user interface 315 includes a pick-up time range 316, a notification explanation 318, and an arrival deadline reminder 320.

As discussed above, the transportation matching system 104 can determine a pick-up time as a pick-up time range. As shown in FIG. 3C, the pick-up time range 316 includes the text "TODAY," "8:30-8:45 AM," and "Your pickup window." However, it will be appreciated that the transportation matching system 104 can provide the pick-up time range to reflect a variety of user selections.

Figure 4:
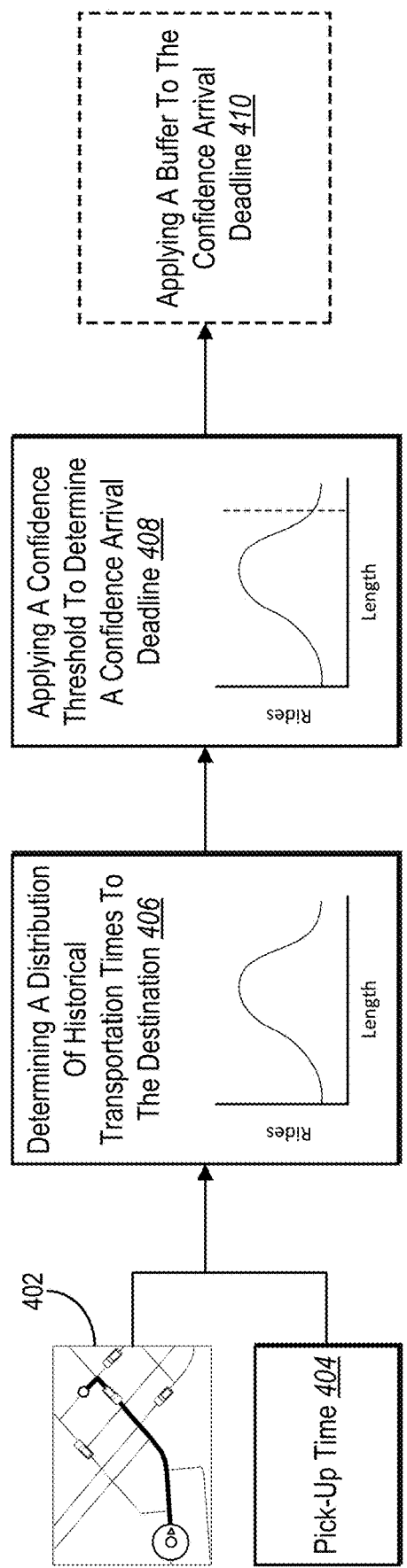
FIG. 4 illustrates a diagram of determining arrival deadlines corresponding to various timeslots in accordance with one or more embodiments.

Turning to FIG. 4, the transportation matching system 104 determines an arrival deadline utilizing a distribution of historical transportation times. More specifically, as shown in FIG. 4, the transportation matching system 104 can determine a pick-up location and destination 402 and a pick-up time 404. As discussed above with regard to FIGS. 3A-3C, in some embodiments the transportation matching system 104 receives user selection of the pick-up location and destination 402 via a first transportation graphical user interface. Further, in one or more embodiments, the transportation matching system 104 receives user selection of the pick-up time 404 as user selection of a timeslot via a scheduled transportation request graphical user interface.

As also shown in FIG. 4, the transportation matching system 104 can perform an act 406 of determining a distribution of historical transportation times to the destination. More specifically, the transportation matching system 104 can utilize similar dates and/or times of day to determine a distribution of historical transportation times from a pick-up location to a destination. As discussed above with regard to FIGS. 3A-3B, the transportation matching system 104 can identify similar dates and/or times and corresponding transportation request data. In addition or in the alternative, the transportation matching system 104 can determine a distribution of historical transportation times based on all transportation requests (e.g. not only similar dates and/or times).

As discussed above, in one or more embodiments, a selected scheduled transportation option corresponds to a shared transportation request. Accordingly, in some embodiments, the transportation matching system 104 generates the distribution of historical transportation times including historical transportation times corresponding to shared and private transportation requests. Accordingly, the transportation matching system 104 accounts for the time spent in shared transportation requests accommodating other pick-ups, drop-offs, and/or other detours. In the alternative, the transportation matching system 104 can generate the distribution of historical transportation times to include only shared transportation times or only private transportation times. Accordingly, the transportation matching system 104 can account for the possibility of adding additional matched requestors in determining an arrival time.

Further, the transportation matching system 104 can perform an act 408 of applying a confidence threshold to determine a confidence arrival deadline. In one or more embodiments, the transportation matching system 104 utilizes a confidence threshold to select a transportation time from the distribution of historical transportation times to determine a confidence transportation time. To illustrate, the transportation matching system 104 can determine the confidence transportation time as the longest transportation time for the transportation request having a sufficient degree of certainty. For example, the transportation matching system 104 utilizes a confidence threshold of a ninetieth percentile on the distribution of historical transportation times, a ninety-fifth percentile on the distribution of historical transportation times, or a ninety-ninth percentile on the distribution of historical transportation times.

Accordingly, the transportation matching system 104 can apply the confidence threshold to determine this confidence transportation times. For example, for a particular transportation request, the transportation matching system 104 can identify a confidence threshold of a ninety-fifth percentile. Thus, the transportation matching system 104 can determine that the confidence transportation time is 16 minutes based on identifying that the ninety-fifth percentile on the distribution of historical transportation times corresponds to a transportation time of 16 minutes.

The transportation matching system 104 can utilize this determined longest transportation time to determine confidence arrival deadline. More specifically, the transportation matching system 104 utilizes the determined longest transportation time relative to the pick-up time. To illustrate, the transportation matching system 104 can determine the confidence arrival deadline by adding the confidence transportation time to the pick-up time. In some embodiments utilizing pick-up time ranges, the transportation matching system 104 can determine a confidence arrival deadline by adding the confidence transportation time to the latest time in the pick-up time range. For example, for a confidence transportation time of 16 minutes and a pick-up time range of 9:00 am-9:15 am, the transportation matching system 104 can determine the confidence arrival deadline is 9:31 am by determining that 9:15 am+0:16=9:31 am.

In one or more embodiments, the transportation matching system 104 can utilize the confidence arrival deadline as the arrival deadline for a transportation request. Additionally, the transportation matching system 104 can perform an optional act 410 of applying a buffer to the confidence arrival deadline. In such embodiments, the transportation matching system 104 can utilize the result as the arrival deadline.

To illustrate, the transportation matching system 104 can apply a buffer of additional time to confidence arrival deadlines to ensure that the transportation matching system 104 will meet a provided arrival deadline. For example, the transportation matching system 104 can apply a buffer of five minutes, ten minutes, etc. For the above example having a confidence arrival deadline of 9:31 am and a five minute buffer, the transportation matching system 104 can determine an arrival deadline of 9:36 am by determining that 9:31 am+0:05=9:36 am.

In one or more embodiments, the transportation matching system 104 determines and utilizes a buffer to account for the potential addition of shared rides to a shared transportation request. For example, in an embodiment for which the distribution of historical transportation times includes individual transportation times, the transportation matching system 104 can determine the buffer as an average, typical, and/or maximum addition of time to accommodate for additional shared rides. In one or more embodiments, the transportation matching system 104 utilizes a historical distribution of added transportation time for shared rides to determine the buffer. Thus, the transportation matching system 104 can add the buffer to the confidence arrival deadline to accommodate for the potential addition of additional rides to a shared transportation request.

As mentioned above, in one or more embodiments, the transportation matching system 104 can apply transportation modifiers to transportation options (e.g., to encourage requestor devices to select particular timeslots). FIG. 5 illustrates an example update to timeslots based on user selection of a timeslot and subsequent presentation to an additional client device. More specifically, FIG. 5 illustrates the requestor device 300 displaying the scheduled transportation request graphical user interface 308. As shown in FIG. 5, the transportation matching system 104 can receive user selection of a timeslot via the scheduled transportation request graphical user interface 308.

Further, as shown in FIG. 5, the transportation matching system 104 can perform an act 501 of determining a balance of transportation requests. In some embodiments, the balance of transportation requests reflects the relative number of scheduled transportation requests received for various timeslots. In addition or in the alternative, the transportation matching system 104 can determine the balance of transportation requests based on the number of scheduled transportation requests received for a timeslot relative to a predicted volume of provider devices providing during the timeslot. The transportation matching system 104 can continuously monitor requestor devices and dynamically update the balance of transportation requests as the transportation matching system 104 receives additional transportation requests. To illustrate, the transportation matching system 104 can dynamically update the balance of transportation requests based on receiving user selection of the timeslot from the requestor device 300.

Additionally, the transportation matching system 104 can perform an act 502 of determining a transportation modifier based on the determined balance. In some embodiments, the transportation matching system 104 determines transportation modifiers to maintain an equal balance of transportation requests among timeslots. To illustrate, the transportation matching system 104 can determine that one or more timeslots with a low balance relative to surrounding timeslots. Accordingly, the transportation matching system 104 determines transportation modifiers to modify the transportation values corresponding to the timeslots and/or presentation of the timeslots in a scheduled transportation request graphical user interface.

As shown in FIG. 5, the transportation matching system 104 can provide, and an additional requestor device 504 can present, an additional scheduled transportation request graphical user interface 506. FIG. 5 illustrates the additional scheduled transportation request graphical user interface 506 including timeslots corresponding to an additional transportation request from the current location of the additional requestor device 504 and "224 Cherry St." Further, the additional scheduled transportation request graphical user interface 506 includes timeslots provided based on transportation modifiers generated in response to user selection received from the requestor device 300.

As shown in FIG. 5, the transportation matching system 104 generates the timeslots based on the pick-up location and drop-off location received at the additional scheduled transportation request graphical user interface 506. To illustrate, the transportation matching system 104 generates the pick-up time 508, the arrival deadline 510, and the transportation value 512. In addition, the transportation matching system 104 also applies transportation modifiers based on the balance of transportation requests determined at the act 501.

As shown in FIG. 5, the transportation matching system 104 applies a transportation modifier to generate the transportation value 512. More specifically, in response to receiving user selection of a timeslot from the requestor device 300, the transportation matching system 104 determined a modification to the timeslot corresponding to 8:00 am. More specifically, the transportation matching system 104 modifies the transportation value for to the timeslot corresponding to 8:00 am by applying the transportation modifier (e.g., reducing the transportation value from $7.50 to $7.00).

Further, as shown in FIG. 5, the transportation matching system 104 applies a size transportation modifier 516. FIG. 5 illustrates that the size transportation modifier 516 enlarges the size of select transportation values within the additional scheduled transportation request graphical user interface 506. However, as discussed above, the transportation matching system 104 can generate and utilize a variety of transportation modifiers. For example, the transportation matching system 104 can generate and utilize transportation modifiers that modify the color, size, font, shading, or other aspects of presentation of a timeslot.

As mentioned above, the transportation matching system 104 can match requestor devices from a set of requestor devices to generate transportation groups that satisfy associated arrival deadlines. FIG. 6A illustrates a process for determining sets of requestor devices and matching requestor devices to generate transportation groups. More specifically, FIG. 6A illustrates a geographic region 604 including requestor devices 606a-606g. As shown in FIG. 6A, the requestor devices 606a-606g each have pick-up locations in the same geographical region during a time range.

The transportation matching system 104 can perform an act 610 of determining a set of requestor devices within a geographic region. To illustrate, the transportation matching system 104 can partition or "bucket" requestor devices by determining compatibility between their corresponding transportation requests. For example, FIG. 6A illustrates a set of requestor devices (i.e., a subset of a larger number of requestor devices) including the requestor devices 606a-606g. The transportation matching system 104 groups the requestor devices 606a-606g together into a set of requestor devices based on compatibility in time and geographical region of transportation request. However, the transportation matching system 104 can identify a variety of sets of requestor devices in a variety of sizes based on a variety of compatibility criteria.

For example, in one or more embodiments, the transportation matching system 104 can determine sets of requestor devices by grouping together requestor devices that are both (1) in the same timeslot (and/or a compatible timeslot), and (2) have pick-up locations and/or destinations in the same geographical region. Accordingly, the transportation matching system 104 can assign a requestor device to a set of requestor devices that are in the same geographical region and with pick-ups occurring in the same time range. Thus, the transportation matching system 104 can improve efficiency by checking for potential requestor device matches among these sets of requestor devices.

The transportation matching system 104 can determine a number or range of requestor devices for a set of requestor devices. As mentioned above, in some embodiments, the transportation matching system 104 determines sets of requestor devices based in part on a common timeslot. In such embodiments, the transportation matching system 104 can generate timeslots that form efficient sets of requestor devices. To illustrate, the transportation matching system 104 can determine a size of a set of requestor devices that is both likely to result in effective requestor device matches and that is of an efficient size for applying a cost function.

In addition or in the alternative, the transportation matching system 104 can partition requestor devices based on compatibility between timeslots, even if timeslots are not matching. For example, a requestor device corresponding to a transportation request with a pick-up time of 9:00 am-9:15 am that takes 45 minutes could be compatible with a requestor device corresponding to a pick-up time of 9:15 am-9:30 am despite the difference of selected timeslot. Accordingly, in one or more embodiments, the transportation matching system 104 partitions requestor devices based on compatibility by identifying overlap in time and location of potential routes corresponding to the requestor devices.

To illustrate, the transportation matching system 104 can determine a range of locations that a requestor device could be at for each time between an earliest possible pick-up time and the arrival deadline and still satisfy the arrival deadline. Further, in some embodiments, the transportation matching system 104 identifies overlap between ranges of locations of various requestor devices. Accordingly, the transportation matching system 104 can assign a requestor device to a set of requestor devices with the most compatibility in overlap between potential locations. For example, the transportation matching system 104 can determine that two transportation requests have substantial overlap utilizing the same highway or freeway in the middle of their potential routes. In another example, the transportation matching system 104 can determine that the beginning of a route for one transportation request overlaps with the middle of a route for another transportation request.

Additionally, the transportation matching system 104 can perform an act 612 of generating a transportation group by matching requestor devices. As mentioned above, the transportation matching system 104 can monitor digital activity of a set of requestor devices, including various requestor selections of timeslots, pick-up locations, destinations, etc. Further, in one or more embodiments, the transportation matching system 104 matches requestor devices based on this monitored data to generate digital transportation groups.

More specifically, the act 612 can include an act 614 of applying a cost function to the set of requestor devices. More specifically, the transportation matching system 104 can analyze a set of requestor devices to identify transportation matches that minimize a cost function. To illustrate, in one or more embodiments, the transportation matching system 104 utilizes a cost function that determines value of a first transportation group relative to the value of other transportation groups and the value of no transportation groups (e.g., fulfilling individual transportation requests with the same parameters).

Accordingly, the transportation matching system 104 can determine an efficiency of a transportation group. To illustrate, the transportation matching system 104 can determine the value of each individual transportation request. Further, the transportation matching system 104 can determine a total value as the sum of each individual transportation request. Additionally, in some embodiments, the transportation matching system 104 determines the efficiency by comparing the total value with the value of each transportation group divided by the number of matched requestor devices.

The transportation matching system 104 can determine the efficiency as a metric such that the cost function seeks to maximize the efficiency. For example, if the value metric for two transportation requests separately is ten, and the value per person of the transportation requests matched is six, the transportation matching system 104 can determine an efficiency of $1-(6/10)=0.4$. Accordingly, the transportation matching system 104 can select the most efficient matches among a set of requestor devices.

The transportation matching system 104 can generate a cost metric for a transportation request utilizing a variety of criteria. In one or more embodiments, the transportation matching system 104 utilizes value to the transportation matching system 104 received from a transportation request to generate a cost metric. In addition or in the alternative, the transportation matching system 104 can utilize time spent and/or distance travelled by a provider device to determine the cost metric. The transportation matching system 104 can determine the time spent and/or distance travelled by the provider device as a result of each requestor device to determine cost metrics for transportation requests separately.

The act 612 can also include an act 616 of determining that estimated arrival times satisfy arrival deadlines. As will be discussed in greater detail with regard to FIG. 7, the transportation matching system 104 can match requestor devices based on determining that a route servicing the requestor devices satisfies all arrival deadlines. For example, in response to identifying a potential requestor device match based on efficiency, the transportation matching system 104 can generate a navigational route for servicing the requestor devices as a matched transportation request.

Thus, the transportation matching system 104 can determine estimated arrival times to each destination in the navigational route. More specifically, as discussed above with regard to FIG. 4, the transportation matching system 104 can utilize historical transportation times to determine transportation times for the generated route. Accordingly, the transportation matching system 104 can utilize the determined transportation times to generate estimated times of arrival at the destinations on the route. Thus, the transportation matching system 104 can compare the estimated times of arrival with the arrival deadlines to ensure that the route satisfies each arrival deadline.

Figure 6A:
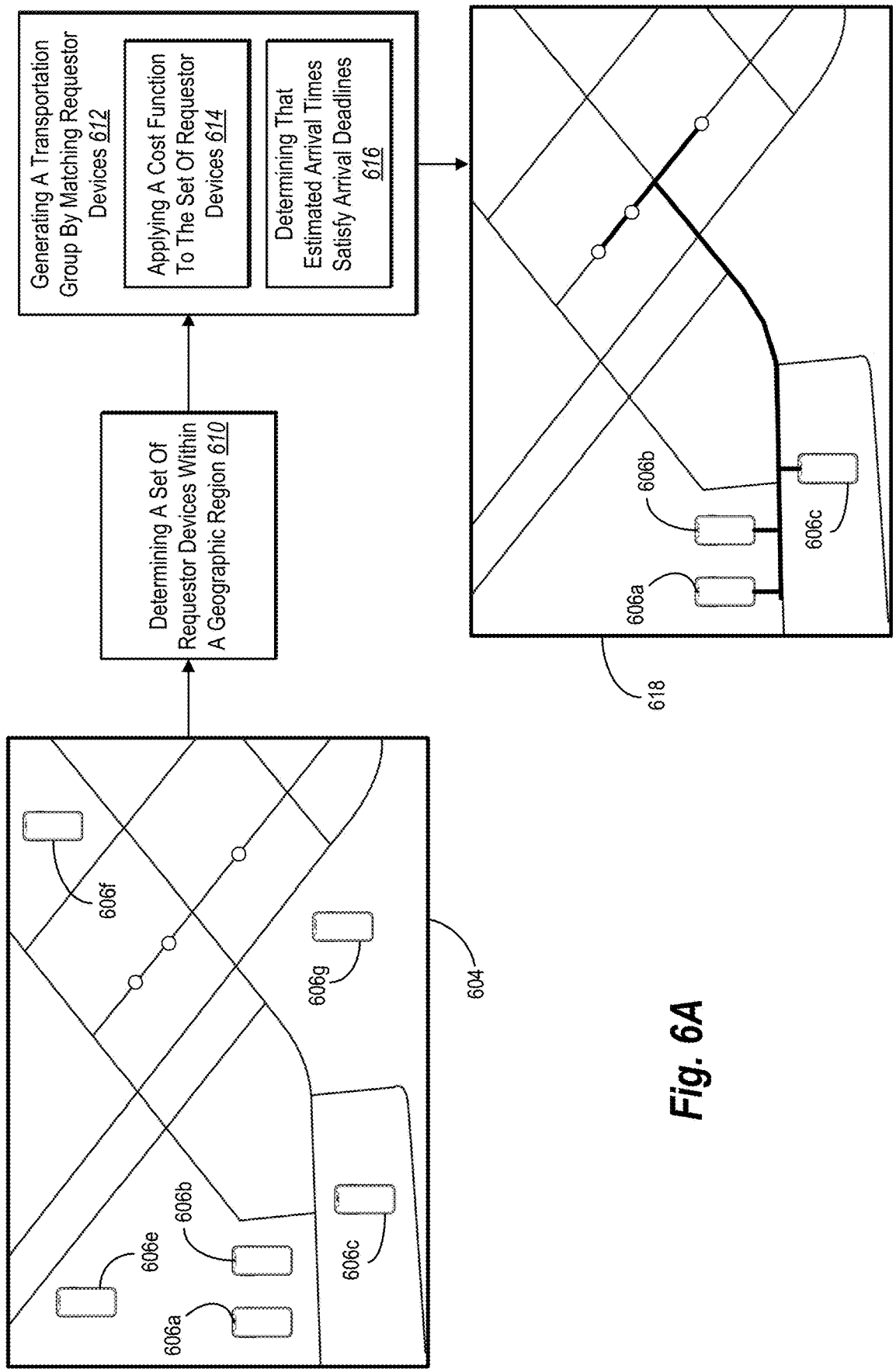
FIG. 6A illustrates a diagram of matching requestor devices to generate transportation groups in accordance with one or more embodiments.

Accordingly, as shown in FIG. 6A, the transportation matching system 104 can generate the transportation group 618. The transportation group 618 includes the requestor devices 606a-606c. To illustrate, the transportation matching system 104 determines that matching the requestor devices 606a-606c generates an efficient match among the set of requestor devices 604. Accordingly, the transportation matching system 104 generates a route for servicing the requestor devices 606a-606c and determines that the route satisfies arrival deadlines corresponding to each of the requestor devices 606a-606c. Thus, the transportation matching system 104 generates the transportation group 618.

As discussed above, the transportation matching system 104 can utilize a cost function to generate transportation groups. FIG. 6B illustrates additional detail for the process of utilizing a cost function. More specifically, FIG. 6B illustrates a process for utilizing a time-dependent threshold in conjunction with a cost function to match requestor devices. As shown in FIG. 6B, the transportation matching system 104 can input a set of requestor devices 620 into a cost function.

The transportation matching system 104 can perform an act 622 of applying a cost function to the set of requestor devices 620. As discussed above, the transportation matching system 104 can apply a cost function to the set of requestor devices to determine an efficiency corresponding to various potential transportation groups. The transportation matching system 104 can select the most efficient transportation group from the set of requestor devices. As discussed above, however, the transportation matching system 104 can dynamically update requestor devices by continuously assigning new requestor devices to sets of requestor devices.

Figure 6B:
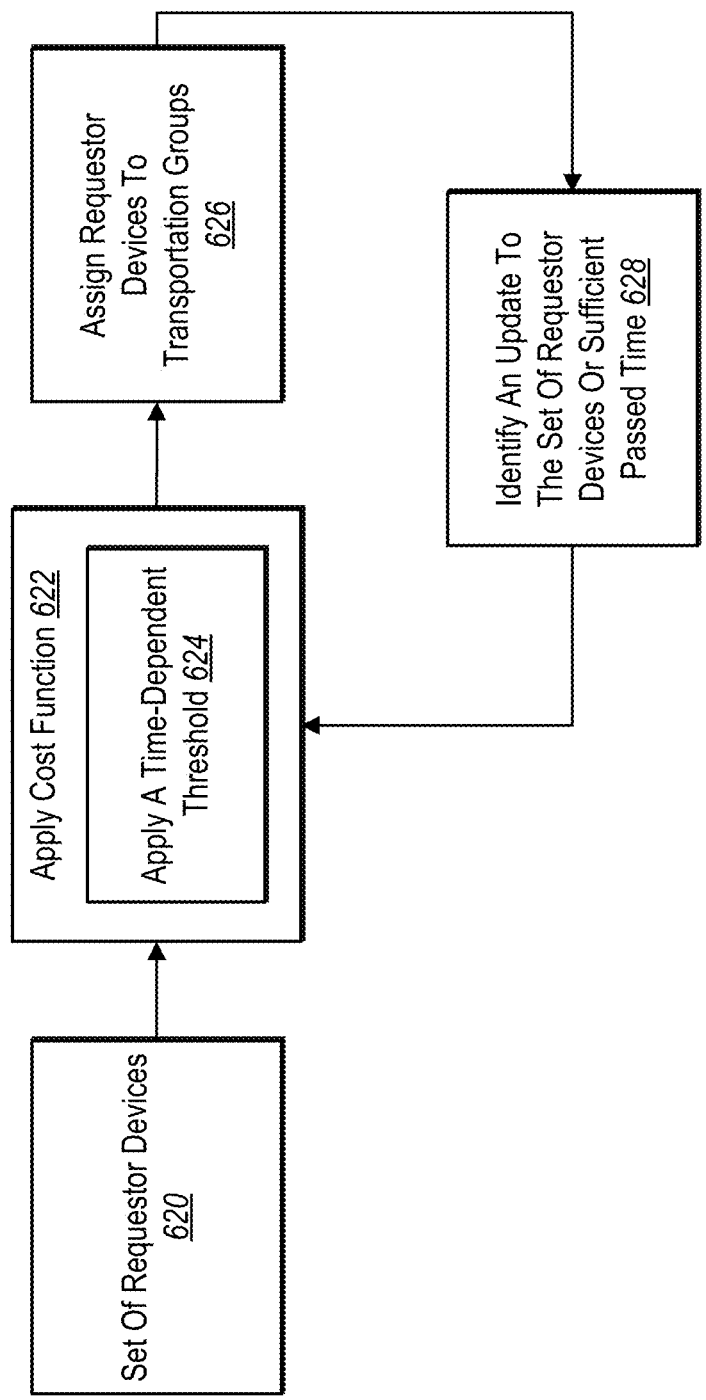
FIG. 6B illustrates a diagram of utilizing a time-dependent threshold to dynamically match requestor devices in accordance with one or more embodiments.

Thus, as shown in FIG. 6B, the act 622 can include an act 624 of applying a time-dependent threshold to the set of requestor devices 620. The transportation matching system 104 can dynamically modify the time-dependent threshold based on the current time relative to pick-up times for requestor devices in a set of requestor devices. More specifically, in some embodiments, the transportation matching system 104 can modify the time-dependent threshold in order to require more efficient matches farther away in time and to accept less efficient matches as pick-up times approach.

Accordingly, in one or more embodiments, the transportation matching system 104 utilizes a time-dependent threshold reflecting a minimum efficiency for a requestor device match. To illustrate, immediately matching devices based only on a current set of requestor devices can lead to sub-optimal matching without any consideration of potential future requestor devices placed in the set of requestor devices. Thus, the transportation matching system 104 can utilize a confidence threshold that must be satisfied in order to match requestor devices. For example, the transportation matching system 104 can utilize a confidence threshold of 0.4 efficiency, 0.5 efficiency, etc.

In one or more embodiments, the transportation matching system 104 can dynamically modify the time-dependent threshold until and/or during pick-up time ranges corresponding to the requestor devices in the set of requestor devices. To illustrate, the transportation matching system 104 can modify a time-dependent threshold based on passing increments of time relative to a latest pick-up time. The transportation matching system 104 can dynamically modify the time-dependent threshold significantly over time. For example, the transportation matching system 104 can modify a time-dependent threshold to require an efficiency of 0.6 at 24 hours before a latest pick-up time, an efficiency of 0.5 at 12 hours before a latest pick-up time, an efficiency of 0.4 at 1 hour before a latest pick-up time, an efficiency of 0.3 at 30 minutes before a latest pick-up time, an efficiency of 0.2 at 15 minutes before a latest pick-up time, and an efficiency of 0.1 at 5 minutes before a latest pick-up time.

In one or more embodiments, the transportation matching system 104 can determine the time-dependent threshold based on a determined likelihood of identifying a requestor device match with improved efficiency in the future. To illustrate, the transportation matching system 104 can utilize a model that reflects changes in efficiency for a particular location (e.g., an efficiency transition matrix). The transportation matching system 104 can utilize such a model to determine, based on the most efficient requestor device match at a current time, the probability of finding a more efficient match at a future time. Accordingly, the transportation matching system 104 can modify the time-dependent threshold based on the determined probability of a more efficient requestor device match in the future.

In one or more embodiments, the transportation matching system 104 generates an efficiency model to determine the likelihood of future efficiency based on historical data. More specifically, the transportation matching system 104 can determine, for historical requestor devices, the percentage of requestor devices that had a particular efficiency at a particular time that also later found a more efficient match. To illustrate, the transportation matching system 104 can identify a requestor device with a current most efficient requestor device match of 0.2 with 24 hours until pick-up. The transportation matching system 104 can determine that 60% of requestor devices with a current most efficient requestor device match of 0.2 with 24 hours until pick-up later yielded a more efficient requestor device match. The transportation matching system 104 can generate a time-dependent efficiency threshold based on the 60% of requestor devices later finding a more efficient match.

The transportation matching system 104 can also perform the act 626 of assigning requestor devices to transportation groups. As discussed above with regard to FIG. 6B, the transportation matching system 104 can apply the cost function to a set of requestor devices to determine the most efficient matches among the set of requestor devices. In one or more embodiments, the transportation matching system 104 matches requestor devices based on determining that the determined efficiency of a potential match satisfies the current time-dependent threshold. Accordingly, the transportation matching system 104 matches requestor devices based on (1) identifying the most efficient match for a requestor device among a set of requestor device, (2) determining that a route for servicing the matched requestor device satisfies each relevant arrival deadline, and (3) determining that the efficiency of the requestor device match satisfies the time-dependent threshold.

Further, the transportation matching system 104 can perform the act 628 of identifying an update to the set of requestor devices or sufficient passed time. Accordingly, the transportation matching system 104 can continuously re-apply the cost function based on an update to the set of requestor devices and/or an update to the time-dependent threshold. Thus, the transportation matching system 104 can both determine matches for unmatched devices based on updates and update existing transportation groups.

To illustrate, in one or more embodiments, the transportation matching system 104 continuously applies the cost function to a set of requestor devices including requestor devices that have already been matched. Thus, the transportation matching system 104 can update requestor device matches in order to generate the most efficient possible transportation groups. In one or more embodiments, the transportation matching system 104 removes a requestor device from a set of requestor devices after the requestor device has been assigned to a provider device and/or picked up by a provider device. Further, in one or more embodiments, the transportation matching system 104 continues to monitor potential additional matches for a requestor device after assignment to and/or pick-up from a provider device. Thus, the transportation matching system 104 can determine a revised route for a requestor device with an additional requestor device match even after pick-up of the requestor device.

Figure 7:
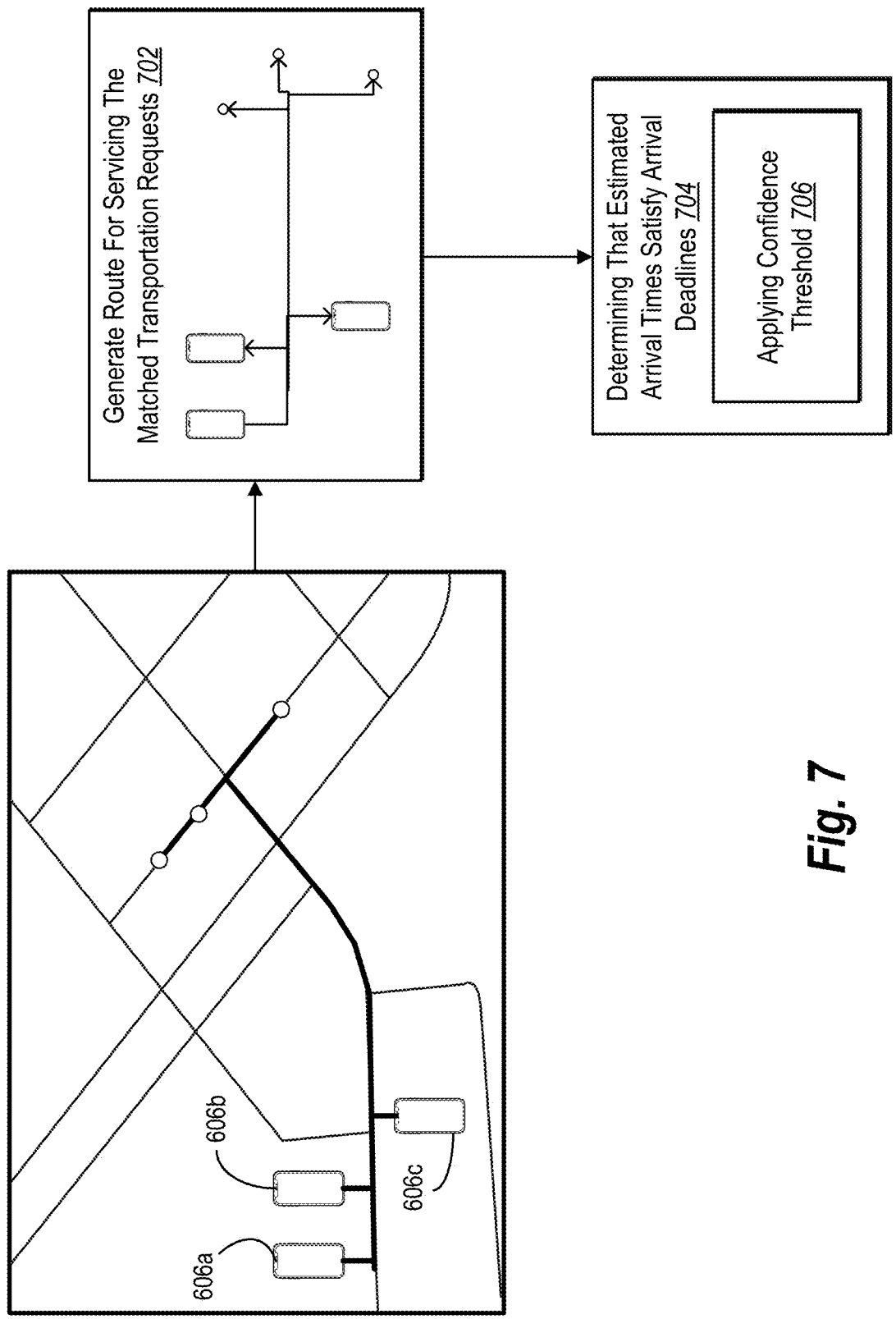
FIG. 7 illustrates a diagram of generating a route for servicing matched transportation requests that satisfy corresponding arrival deadlines in accordance with one or more embodiments.

As mentioned above, the transportation matching system 104 can generate routes for servicing requestor devices. FIG. 7 illustrates additional detail for a process for utilizing a determined route to determine that the transportation matching system 104 can satisfy all arrival deadlines associated with a transportation group. For example, as shown in FIG. 7, the transportation matching system 104 receives a transportation group comprising the requestor devices 506a-506c.

As shown in FIG. 7, the transportation matching system 104 can perform an act 702 of generating a route for servicing the matched transportation requests. As discussed briefly above, the transportation matching system 104 can generate a route to service transportation requests corresponding to a transportation group. To illustrate, the transportation matching system 104 generates a routes including pick-ups and drop-offs for each of the requestor devices in the transportation group. Thus, the transportation matching system 104 can determine times for each pick-up and drop-off.

Additionally, as shown in FIG. 7, the transportation matching system 104 can perform an act 704 of determining that estimated arrival times satisfy arrival deadlines. As further shown in FIG. 7, the act 706 can include an act 706 for applying a confidence threshold. Similar to the discussion above with regard to FIG. 4, the transportation matching system 104 can determine a distribution of historical transportation times for the determined route. Thus, the transportation matching system 104 can apply a confidence threshold to the distribution of historical transportation times to identify a transportation time having a certainty in accordance with the confidence threshold. Accordingly, the transportation matching system 104 can determine estimated arrival times associated with the transportation request having a confidence satisfying the confidence threshold. Thus, the transportation matching system 104 can determine whether the transportation matching system 104 can satisfy each arrival deadline for a potential transportation group.

Figure 8:
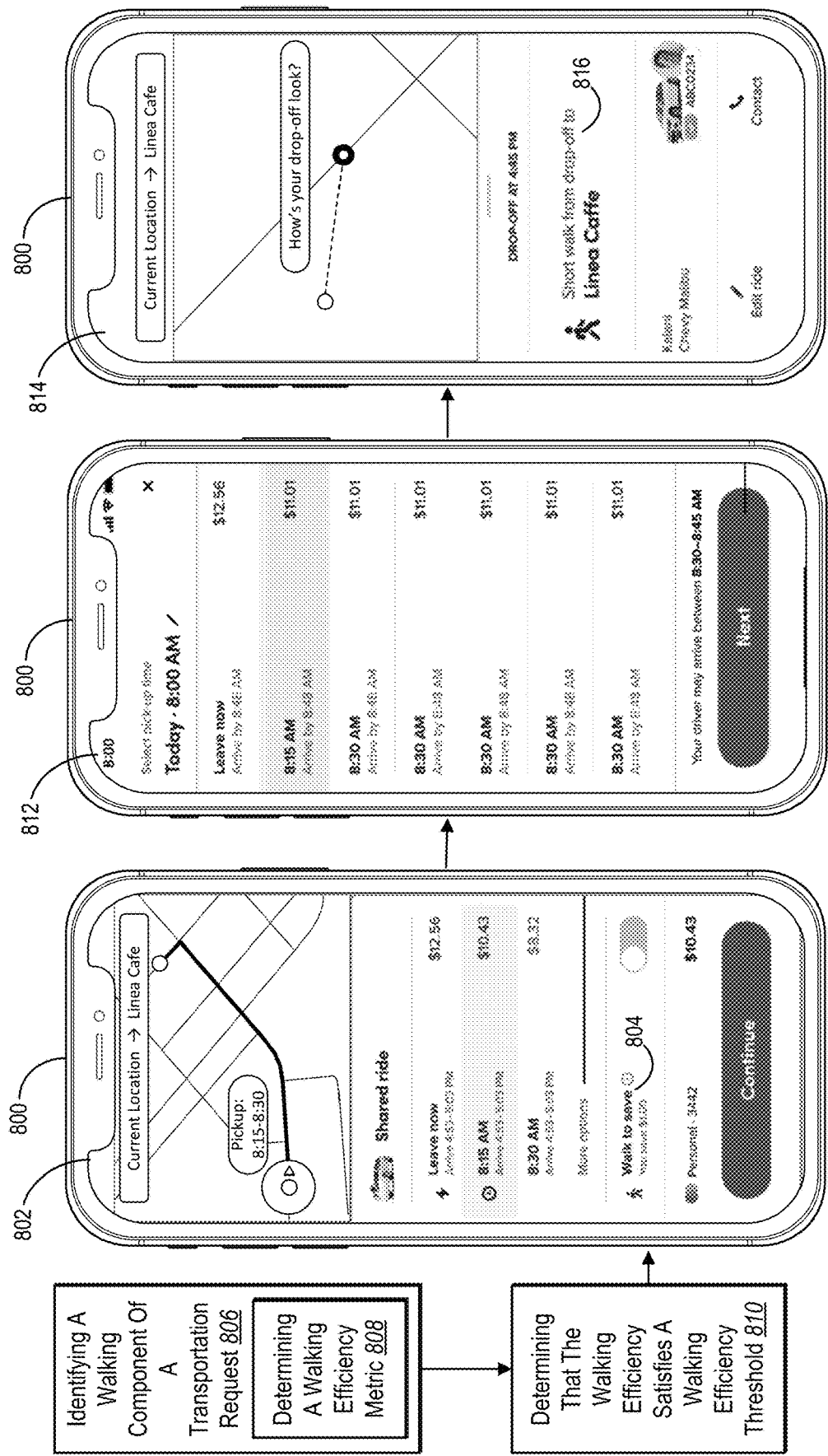
FIG. 8 illustrates example graphical user interfaces for providing and implementing a walking component for a scheduled transportation request in accordance with one or more embodiments.

As mentioned briefly above, the transportation matching system 104 can identify and implement a walking component as part of a scheduled transportation request. FIG. 8 illustrates identifying and implementing a walking component in accordance with one or more embodiments. More specifically, FIG. 8 illustrates a requestor device 800 receiving and implementing a walking component for a transportation request.

Additionally, as shown in FIG. 8, the transportation matching system 104 can perform an act 806 of identifying a walking component of a transportation request. In response to receiving a requestor device selection of a pick-up location and a destination, the transportation matching system 104 can consider walking components. In one or more embodiments, the transportation matching system 104 identifies a walking component based on identifying a portion of a route for a transportation request that is more navigable walking than driving. To illustrate, in some embodiments, the transportation matching system 104 identifies a location nearby to a pick-up location and/or drop-off location that the requestor device could walk to or from to improve the efficiency of a route.

In one or more embodiments, the transportation matching system 104 identifies a portion at the beginning and/or end of a route for a transportation request that is likely to cause a delay near pick-up and/or drop-off. Further, in one or more embodiments, the transportation matching system 104 identifies a location within a short walking distance of the pick-up location and/or destination of the transportation request is unlikely to cause a delay near pick-up and/or drop-off. In some embodiments, the transportation matching system 104 utilizes historical transportation data to identify the walking component of the transportation request.

Further, as shown in FIG. 8, the act 806 can include an act 808 of determining a walking efficiency metric. The transportation matching system 104 determines an additional value to the transportation matching system 104 of implementing the walking component. To illustrate, the transportation matching system 104 can determine the walking efficiency metric by determining the value to the transportation matching system 104 of avoiding the delay and/or shortening the route for the transportation request. Additionally, the walking efficiency metric can reflect additional value including an improvement in an estimated time of arrival, a reduction in time for a provider device match, and/or additional transportation improvements. In some embodiments, the transportation matching system 104 further determines a reduction in a transportation value to determine the walking efficiency metric.

The transportation matching system 104 can also perform an act 810 of determining that the walking efficiency metric satisfies a walking efficiency threshold. In some embodiments, the transportation matching system 104 utilizes a walking efficiency threshold that represents a minimum value to the transportation matching system 104 to implement the walking component. The transportation matching system 104 can compare the determined walking efficiency metric to the walking efficiency threshold to determine whether the walking efficiency metric satisfies the walking efficiency threshold.

In one or more embodiments, the transportation matching system 104 determines the walking efficiency threshold as a metric that must be satisfied in order to present a corresponding walking component. More specifically, in some embodiments, the transportation matching system 104 determines the walking efficiency threshold based on a percentage of the overall value of the transportation request that is gained by implementing the walking component. Additionally or in the alternative, the transportation matching system 104 can determine the walking efficiency threshold based on a historical analysis of user preferences and/or responses to presentation of a walking component for a transportation request.

As shown in FIG. 8, the requestor device 800 can present a scheduled transportation request graphical user interface 812. Similar to discussion above with regard to scheduled transportation request graphical user interfaces, the scheduled transportation request graphical user interface 812 can include a variety of timeslots for selection. More specifically, the scheduled transportation request graphical user interface 812 includes timeslots corresponding to a transportation request where the transportation matching system 104 implements a walking component. The transportation matching system 104 can receive selection of a timeslot and can implement the walking component in response to receiving the user selection of the timeslot.

As shown in FIG. 8, the requestor device 800 presents a first transportation graphical user interface 802. The first transportation graphical user interface 802 includes a transportation request with a pick-up location of the current location of the requestor device 800 and a destination of "Linea Cafe." The first transportation graphical user interface 804 includes a walking component toggle 804. FIG. 8 illustrates the walking component toggle 804 including the text "Walk to save" and "You can save $1.00."

However, the transportation matching system 104 can generate and provide the walking component toggle 804 including a variety of information regarding a variety of transportation requests. In response to receiving user input at the walking component toggle 804, the transportation matching system 104 can turn on and off consideration of potential walking components for transportation requests. Indeed, in one or more embodiments, the transportation matching system 104 does not provide a walking component toggle, and instead provides walking components without regard to a particular requestor device setting for walking.

Further, the requestor device 800 can present the transportation request confirmation graphical user interface 814. As shown in FIG. 8, the transportation request confirmation graphical user interface 814 can include a walking information panel 816. The walking information panel can include information for the walking component, including information about the drop-off location relative to the destination. More specifically, the walking information panel 816 includes the text "Short walk from drop-off to Linea Cafe." However, it will be appreciated that the transportation matching system 104 can generate the walking information panel 816 to include a variety of information corresponding to a variety of walking components. More specifically, the transportation matching system 104 can generate information regarding the walking component, including distance, drop-off location, pick-up location and/or current location.

Figure 9:
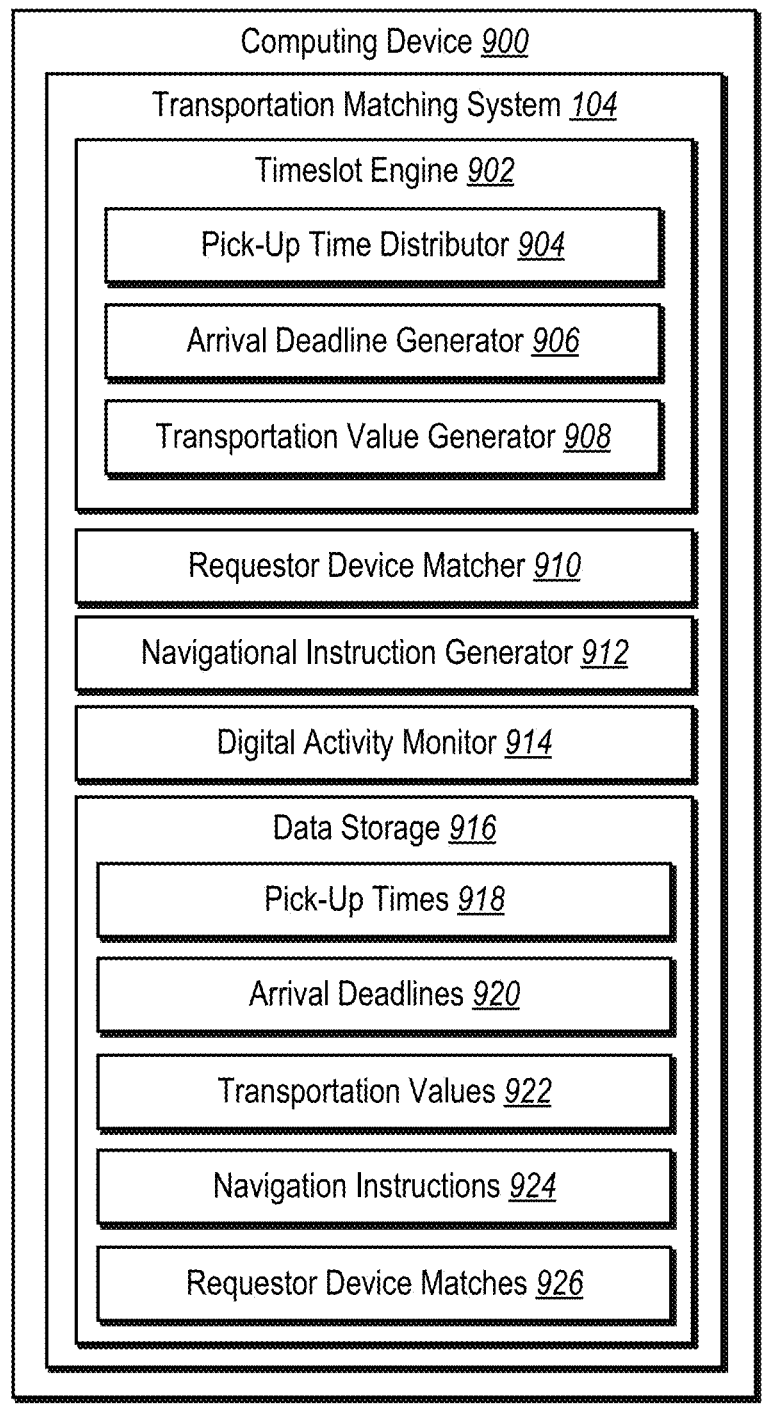
FIG. 9 illustrates a schematic diagram of a transportation matching system in accordance with one or more embodiments.

Turning to FIG. 9, additional detail will now be provided regarding various components and capabilities of the transportation matching system 104. In particular, FIG. 9 illustrates an example schematic diagram of the transportation matching system 104 implemented by a computing device 900 (e.g., the server(s) 102, the provider devices 106 and/or the requestor devices 110) in accordance with one or more embodiments of the present disclosure. As shown, the computing device 900 can implement the transportation matching system 104. Also illustrated, the transportation matching system 104 can include a timeslot engine 902, a pick-up time distributor 904, an arrival deadline generator 906, a transportation value generator 908, a requestor device matcher 910, a navigational instruction generator 912, a digital activity monitor 914, and a data storage 916.

The computing device 900 includes the timeslot engine 902. The timeslot engine 902 can generate timeslots based on a variety of historical transportation request data. Thus, the timeslot engine 902 generates pick-up times, arrival deadlines, and transportation values corresponding to each timeslot. Accordingly, the timeslot engine 902 can include the pick-up time distributor 904, the arrival deadline generator 906, and the transportation value generator 908.

Further, the computing device 900 includes the pick-up time distributor 904. The pick-up time distributor 904 determines time ranges corresponding to timeslots. In one or more embodiments, the pick-up time distributor 904 utilizes historical data reflecting the volume of transportation requests and the volume of provider devices providing during similar historical time periods. More specifically, the pick-up time distributor 904 can partition a period of time into a number of timeslots based on the historical transportation request data. Further, the pick-up time distributor 904 can determine a pick-up time range for each timeslot.

Additionally, the computing device 900 includes the arrival deadline generator 906. The arrival deadline generator 906 generates arrival deadlines for a variety of timeslots and a variety of pick-up locations and destinations. More specifically, the arrival deadline generator 906 can determine a distribution of historical transportation times from a pick-up location to a destination utilizing the pick-up time range for each timeslot. Further, the arrival deadline generator 906 can apply a confidence threshold to the distribution of historical transportation times and/or apply a buffer to determine arrival deadlines.

Also, the computing device 900 includes the transportation value generator 908. The transportation value generator 908 determines transportation values for various transportation requests and various timeslots. To illustrate, the transportation value generator 908 can utilize the pick-up time range, the arrival deadline, the pick-up location, and a destination particular to a timeslot and transportation request to determine transportation values. Further, in some embodiments, the transportation value generator 908 can determine and apply transportation modifiers to transportation values.

The computing device 900 also includes the requestor device matcher 910. The requestor device matcher 910 matches requestor devices to generate transportation groups. In one or more embodiments, the requestor device matcher 910 generates transportation groups from among a set of requestor devices. For example, the requestor device matcher 910 can apply a cost function to a set of requestor devices to generate one or more transportation groups. More specifically, in some embodiments, the requestor device matcher 910 applies the cost function to identify transportation groups that minimize a cost metric subject to a constraint of satisfying each arrival deadline.

Further, the computing device 900 includes the navigational instruction generator 912. The navigational instruction generator 912 can generate routes for transportation requests associated with a transportation group. Further, the navigational instruction generator 912 can determine navigational instructions corresponding to a route. In one or more embodiments, the navigational instruction generator 912 provides the navigational instructions for the route to an assigned provider device.

Additionally, the computing device 900 includes the digital activity monitor 914. The digital activity monitor 914 can monitor, record, and transmit data corresponding to digital activity of a variety of requestor devices to the transportation matching system 104. More specifically, in some embodiments, the digital activity monitor 914 monitors requestor selection and interaction within various transportation graphical user interfaces. For example, the digital activity monitor 914 can monitor selection of pick-up location, destination, scheduled transportation options, and timeslots.

Also, the computing device 900 includes the data storage 916. The data storage 916 maintains data for the transportation matching system 104. The data storage 916 (e.g., via one or more memory devices) can maintain data of any type, size, or kind, as necessary to perform the functions of the transportation matching system 104, including data received from provider devices and/or requestor devices. For example, as shown in FIG. 9, the data storage 916 can include pick-up times 918, arrival deadlines 920, transportation values 922, navigation instructions 924, and requestor device matches 926.

Each of the components 902-916 of the transportation matching system 104 can include software, hardware, or both. For example, the components 902-916 can include one or more instructions stored on a computer-readable storage medium and executable by processors of one or more computing devices, such as a client device or server device.

When executed by the one or more processors, the computer-executable instructions of the transportation matching system 104 can cause the computing device(s) to perform the methods described herein. Alternatively, the components 902-916 can include hardware, such as a special-purpose processing device to perform a certain function or group of functions. Alternatively, the components 902-916 of the transportation matching system 104 can include a combination of computer-executable instructions and hardware.

Furthermore, the components 902-916 of the transportation matching system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-916 may be implemented as a stand-alone application, such as a desktop or mobile application. Furthermore, the components 902-916 may be implemented as one or more web-based applications hosted on a remote server. The components 902-916 may also be implemented in a suite of mobile device applications or "apps."

Figure 10:
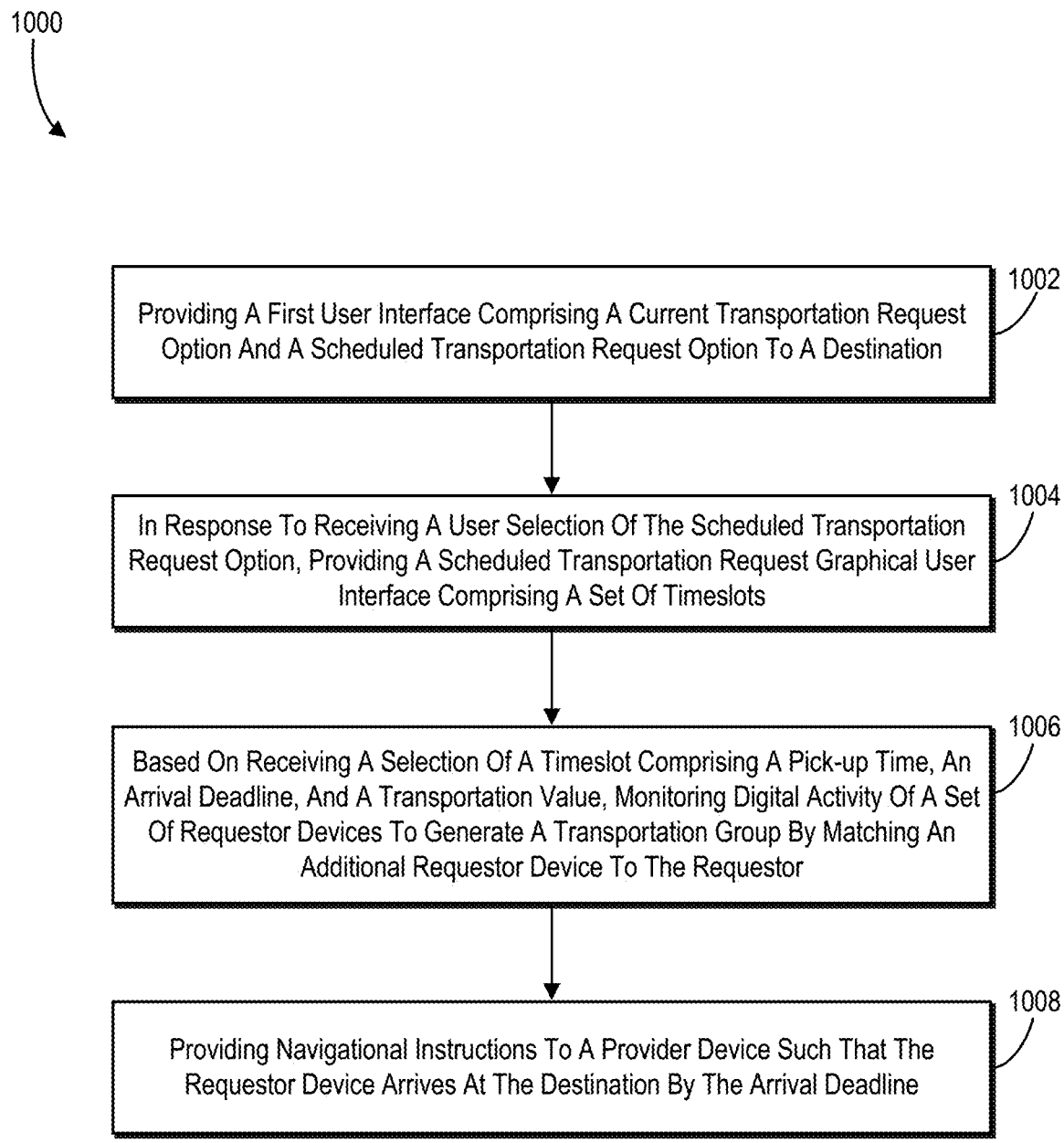
FIG. 10 illustrates a flowchart of a series of acts for generating transportation groups in accordance with one or more embodiments.

FIGS. 1-9, the corresponding text, and the examples provide a number of different methods, systems, devices, and non-transitory computer-readable media of the transportation matching system 104. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for matching requestor devices to generate transportation groups in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 for providing a first graphical user interface comprising a current transportation request option and a scheduled transportation request option to a destination. In particular, the act 1002 can include providing, for display to a requestor device, a first graphical user interface comprising a current transportation request option and a scheduled transportation request option to a destination. Specifically, the act 1002 can include providing, for display to the additional requestor device, the first graphical user interface comprising an additional transportation request option and an additional scheduled transportation request option to an additional destination, based on receiving the selection of the timeslot from the requestor device and in response to receiving an additional selection of the additional scheduled transportation request option from the additional requestor device: determining one or more transportation modifiers for the timeslots, and providing for display to the additional requestor device, the scheduled transportation request graphical user interface comprising the set of timeslots and the one or more transportation modifiers.

Further, in some embodiments, the act 1002 includes determining, in response to receiving the selection of the timeslot, a balance of transportation requests corresponding to the set of timeslots and determining the one or more transportation modifiers based on the balance of transportation requests. Additionally, the act 1002 can include wherein the one or more transportation modifiers comprises at least one of: a color modifier, a size modifier, or a transportation value modifier. The act 1002 can also include wherein the scheduled transportation request option comprises a shared transportation request option.

Additionally, the series of acts 1000 includes an act 1004 for in response to receiving a user selection of the scheduled transportation request option, providing a scheduled transportation request graphical user interface comprising a set of timeslots. In particular, the act 1004 can include in response to receiving a user selection of the scheduled transportation request option, providing for display a scheduled transportation request graphical user interface comprising a set of timeslots and corresponding pick-up times, arrival deadlines at the destination, and transportation values. Specifically, the act 1004 can include generating the set of timeslots by identifying historical request data corresponding to a geographical region and time associated with the requestor device and generating the set of timeslots based on the historical request data.

Further, the series of acts 1000 includes an act 1006 for, based on receiving a selection of a timeslot comprising a pick-up time, an arrival deadline, and a transportation value, monitoring digital activity of a set of requestor devices to generate a transportation group by matching an additional requestor device to the requestor. In particular, the act 1006 can include based on receiving a selection of a timeslot comprising a pick-up time, an arrival deadline, and a transportation value, monitoring digital activity of a set of requestor devices to generate a transportation group by matching an additional requestor device to the requestor device based on the timeslot and the arrival deadline. Specifically, the act 1006 can include identifying user interaction with the timeslot via the set of requestor devices, and determining, via global positioning systems of the set of requestor devices, that the set of requestor devices are located within a geographic region, and determining the transportation group by applying a cost function to the set of requestor devices subject to a constraint satisfying the arrival deadline.

Additionally, in one or more embodiments, the act 1006 includes determining a distribution of historical transportation times to the destination, applying a confidence threshold to distribution of historical transportation times to determine a confidence arrival deadline, and applying a buffer to the confidence arrival deadline to determine the arrival deadline. The act 1006 can include receiving an additional transportation request comprising an additional arrival deadline associated with the additional requestor device, matching the requestor device and the additional requestor device by determining a route for servicing the transportation request and the additional transportation request, determining estimated arrival times for the route, and determining that the estimated arrival times satisfy the arrival deadline and the additional arrival deadline utilizing the confidence threshold.

Also, the series of acts 1000 includes an act 1008 for providing navigational instructions to a provider device such that the requestor device arrives at the destination by the arrival deadline. In particular, the act 1008 can include based on receiving a selection of a timeslot comprising a pick-up time, an arrival deadline, and a transportation value, providing navigational instructions to a provider device to transport the requestor device and the additional requestor device in the transportation group such that the requestor device arrives at the destination by the arrival deadline. Specifically, the act 1008 can include identifying a walking component for the transportation request, determining a walking efficiency metric corresponding to the walking component, and based on determining that the walking efficiency metric satisfies a walking efficiency threshold, providing an option corresponding to the walking component within the first graphical user interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
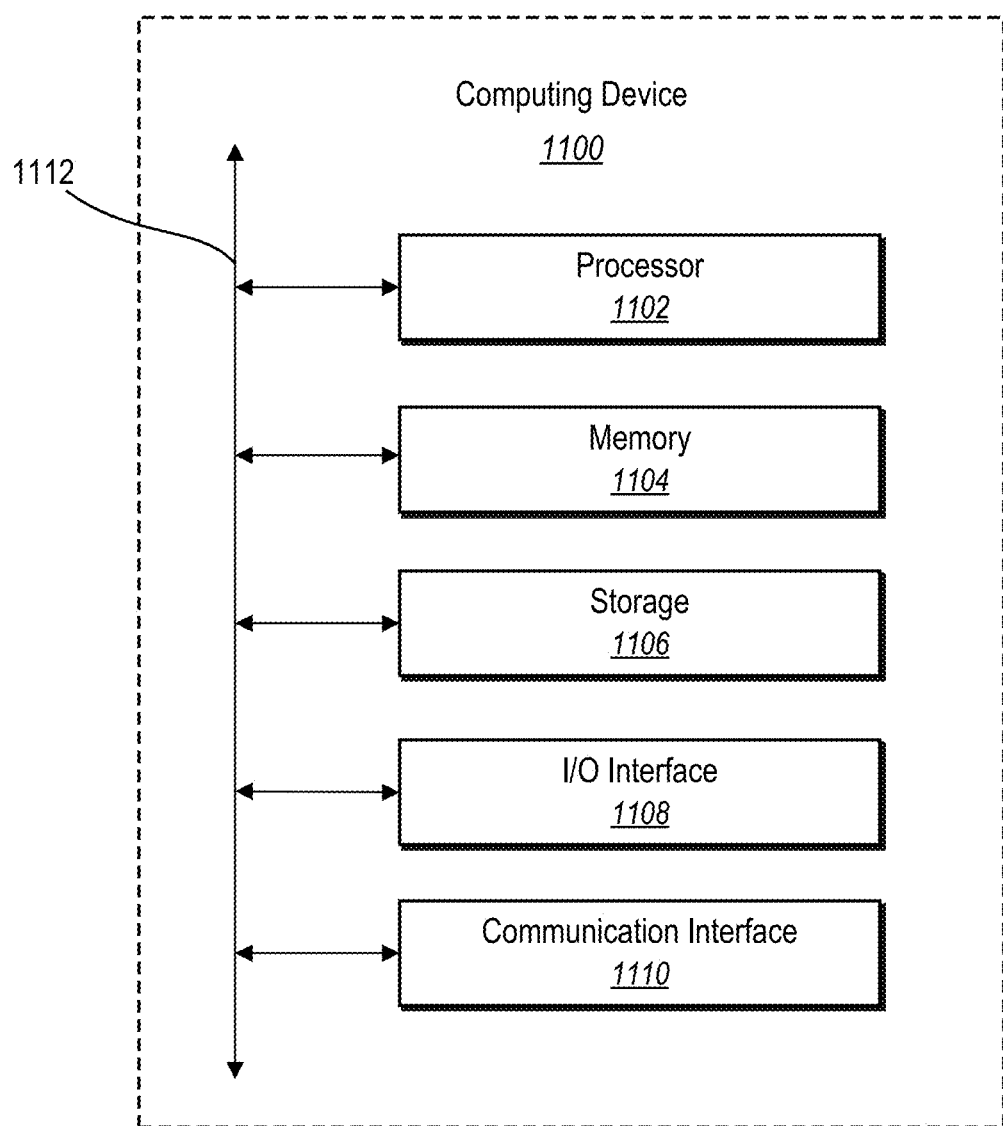
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device 900, the server(s) 102, the provider device(s) 106, requestor device(s) 110). In one or more embodiments, the computing device 1100 may be a mobile device (e.g., a mobile telephone, a smartphone, a PDA, a tablet, a laptop, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

Figure 12:
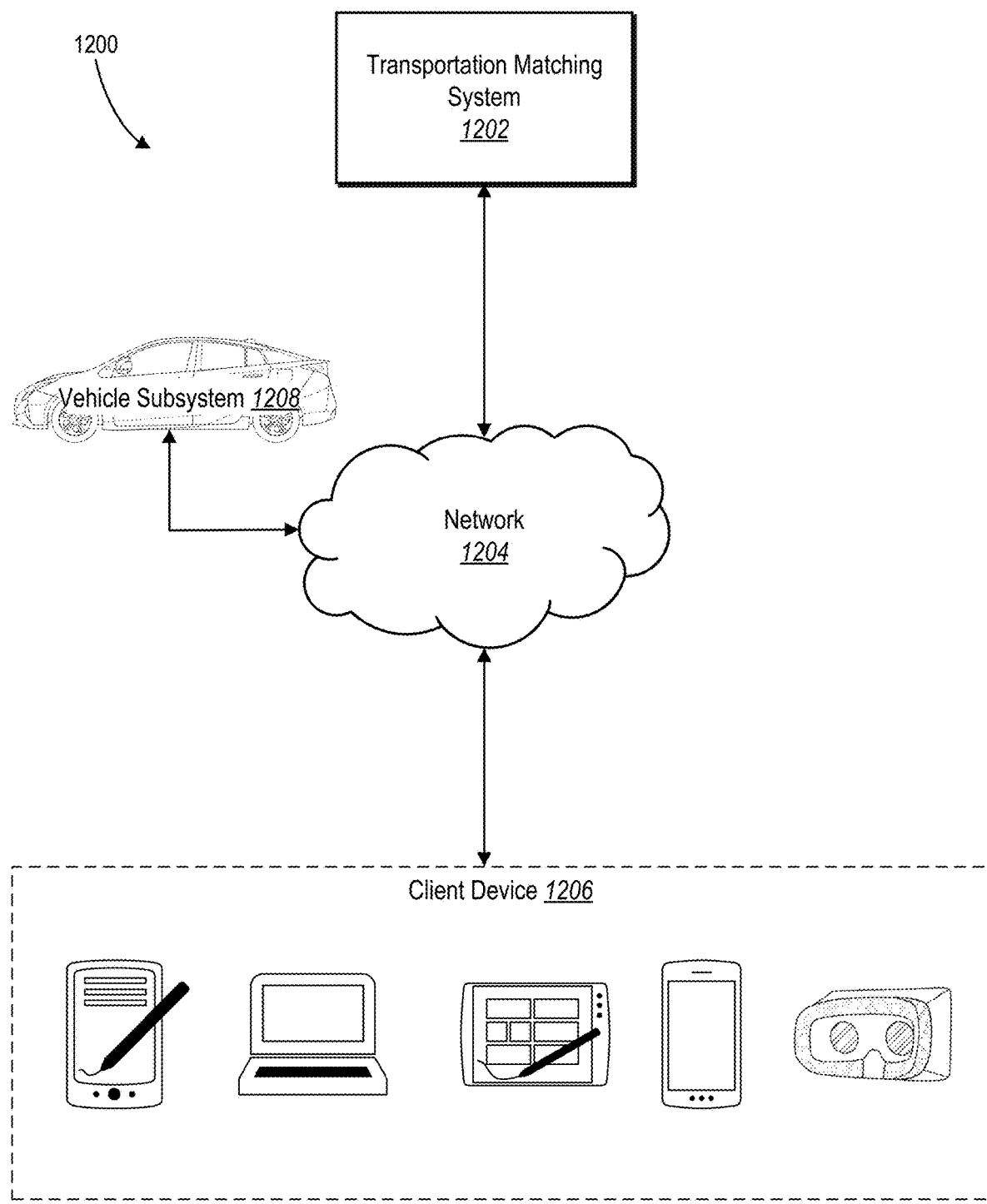
FIG. 12 illustrates an example network environment of a transportation matching system in accordance with one or more embodiments.

FIG. 12 illustrates an example network environment 1200 of a transportation matching system (e.g., the transportation matching system 104). The network environment 1200 includes a client device 1206, a transportation matching system 1202, and a vehicle subsystem 1208 connected to each other by a network 1204. Although FIG. 12 illustrates a particular arrangement of the client device 1206, the transportation matching system 1202, the vehicle subsystem 1208, and the network 1204, this disclosure contemplates any suitable arrangement of the client device 1206, the transportation matching system 1202, the vehicle subsystem 1208, and the network 1204. As an example, and not by way of limitation, two or more of the client devices 1206, the transportation matching system 1202, and the vehicle subsystem 1208 communicate directly, bypassing the network 1204. As another example, two or more of the client devices 1206, the transportation matching system 1202, and the vehicle subsystem 1208 may be physically or logically co-located with each other in whole or in part. Moreover, although FIG. 12 illustrates a particular number of the client devices 1206, the transportation matching systems 1202, the vehicle subsystems 1208, and the networks 1204, this disclosure contemplates any suitable number of the client devices 1206, the transportation matching systems 1202, the vehicle subsystems 1208, and the networks 1204. As an example, and not by way of limitation, the network environment 1200 may include multiple client devices 1206, the transportation matching systems 1202, the vehicle subsystems 1208, and the networks 1204.

This disclosure contemplates any suitable network 1204. As an example, and not by way of limitation, one or more portions of the network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1204 may include one or more networks 1204.

Links may connect the client device 1206, the transportation matching system 1202, and the vehicle subsystem 1208 to the communication network 1204 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by the client device 1206. As an example, and not by way of limitation, a client device 1206 may include any of the computing devices discussed above in relation to FIG. 12. A client device 1206 may enable a network user at the client device 1206 to access a network. A client device 1206 may enable its user to communicate with other users at other client devices 1206.

In particular embodiments, the client device 1206 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1202 may be a network-addressable computing system that can host a ride share transportation network. The transportation matching system 1202 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the transportation matching system 1202. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the transportation matching system 1202 may manage ride matching services to connect a user/requestor with a vehicle and/or provider. By managing the ride matching services, the transportation matching system 1202 can manage the distribution and allocation of vehicle subsystem resources and user resources such as GPS location and availability indicators, as described herein.

The transportation matching system 1202 may be accessed by the other components of the network environment 1200 either directly or via network 1204. In particular embodiments, the transportation matching system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a transportation matching system 1202 to manage, retrieve, modify, add, or delete, the information stored in data store.

In particular embodiments, the transportation matching system 1202 may provide users with the ability to take actions on various types of items or objects, supported by the transportation matching system 1202. As an example, and not by way of limitation, the items and objects may include ride share networks to which users of the transportation matching system 1202 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1202 or by an external system of a third-party system, which is separate from the transportation matching system 1202 and coupled to the transportation matching system 1202 via a network 1204.

In particular embodiments, the transportation matching system 1202 may be capable of linking a variety of entities. As an example, and not by way of limitation, the transportation matching system 1202 may enable users to interact with each other or other entities, or to allow users to interact with these entities through an application programming interfaces (API) or other communication channels.

In particular embodiments, the transportation matching system 1202 may include a variety of servers, sub-systems, programs, modules, logs, and data stores. In particular embodiments, the transportation matching system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1202 may also include suitable components such as network interfaces, security mechanisms, load balancers, failover servers, management-and-network-operations consoles, other suitable components, or any suitable combination thereof. In particular embodiments, the transportation matching system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1202 and one or more client devices 1206. An action logger may be used to receive communications from a web server about a user's actions on or off the transportation matching system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from the client device 1206 responsive to a request received from the client device 1206. Authorization servers may be used to enforce one or more privacy settings of the users of the transportation matching system 1202. A privacy setting of a user determines how particular information associated with a user can be shared. The authorization server may allow users to opt in to or opt out of having their actions logged by the transportation matching system 1202 or shared with other systems, such as, for example, by setting appropriate privacy settings. Third-party-content-object stores may be used to store content objects received from third parties. Location stores may be used for storing location information received from the client devices 1206 associated with users.

In addition, the vehicle subsystem 1208 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once i.e., split up throughout the vehicle subsystem 1208 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1208 may include a communication device capable of communicating with the client device 1206 and/or the transportation matching system 1202. For example, the vehicle subsystem 1208 can include an on-board computing device communicatively linked to the network 1204 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
providing, for display to a requestor device, a first graphical user interface comprising a current transportation request option and a scheduled transportation request option to a destination;
determining a predicted volume of transportation requests during a future time period and a predicted volume of provider devices during the future time period based on historical data;
generating a number of timeslots and a duration of timeslots within a set of timeslots to display from the predicted volume of transportation requests and the predicted volume of provider devices;
in response to receiving a user selection of the scheduled transportation request option, providing for display a scheduled transportation request graphical user interface comprising a set of timeslots according to the number of timeslots and the duration of the timeslots, pick-up times corresponding to the set of timeslots, arrival deadlines at the destination corresponding to the set of timeslots, and transportation values corresponding to the set of timeslots; and
based on receiving a selection of a timeslot comprising a pick-up time, an arrival deadline, and a transportation value:
identifying a set of requestor devices associated with the timeslot for potential matching with the requestor device based on user interaction with the timeslot via the set of requestor devices according to the selection of the timeslot from the scheduled transportation request graphical user interface;
monitoring digital activity of the set of requestor devices associated with the timeslot;
generating, utilizing an efficiency transition model prior to a pick-up of the requestor device, a transportation group by matching an additional requestor device of the set of requestor devices associated with the timeslot to the requestor device based on the selection of the timeslot and the arrival deadline from the scheduled transportation request graphical user interface;
determining one or more transportation modifiers for the timeslots;
providing, for display to the additional requestor device, the scheduled transportation request graphical user interface comprising the set of timeslots and the one or more transportation modifiers; and
providing navigational instructions to a provider device to service a transportation request and transport the requestor device and the additional requestor device in the transportation group according to the selection of the timeslot from the scheduled transportation request graphical user interface such that the requestor device arrives at the destination by the arrival deadline.

2. The method of claim 1, further comprising providing, for display to the additional requestor device, the first graphical user interface comprising an additional transportation request option and an additional scheduled transportation request option to an additional destination.

3. The method of claim 2, further comprising:
determining the one or more transportation modifiers for the timeslots based on receiving the selection of the timeslot from the requestor device and in response to receiving an additional selection of the additional scheduled transportation request option from the additional requestor device.

4. The method of claim 3, wherein determining the one or more transportation modifiers for the timeslots comprises:
determining, in response to receiving the selection of the timeslot, a balance of transportation requests corresponding to the set of timeslots; and
determining the one or more transportation modifiers based on the balance of transportation requests.

5. The method of claim 3, wherein the one or more transportation modifiers comprises at least one of: a color modifier, a size modifier, or a transportation value modifier.

6. The method of claim 1, wherein monitoring the digital activity of the set of requestor devices comprises: identifying user interaction with the timeslot via the set of requestor devices, and further comprising:
determining, via global positioning systems of the set of requestor devices, that the set of requestor devices are located within a geographic region; and
determining the transportation group by applying a cost function to the set of requestor devices subject to a constraint satisfying the arrival deadline.

7. The method of claim 6, further comprising determining the arrival deadline by:
determining a distribution of historical transportation times to the destination;
applying a confidence threshold to distribution of historical transportation times to determine a confidence arrival deadline; and
applying a buffer to the confidence arrival deadline to determine the arrival deadline.

8. The method of claim 7, further comprising:
receiving an additional transportation request comprising an additional arrival deadline associated with the additional requestor device;
matching the requestor device and the additional requestor device by determining a route for servicing the transportation request and the additional transportation request;
determining estimated arrival times for the route; and
determining that the estimated arrival times satisfy the arrival deadline and the additional arrival deadline utilizing the confidence threshold.

9. The method of claim 1, further comprising:
identifying a walking component for the transportation request;
determining a walking efficiency metric corresponding to the walking component; and
based on determining that the walking efficiency metric satisfies a walking efficiency threshold, providing an option corresponding to the walking component within the first graphical user interface.

10. The method of claim 1, wherein the scheduled transportation request option comprises a shared transportation request option.

11. A non-transitory computer-readable medium storing instructions that, when executed by at least one processor, cause a computer system to:
provide, for display to a requestor device, a first graphical user interface comprising a current transportation request option and a scheduled transportation request option to a destination;
determine a predicted volume of transportation requests during a future time period and a predicted volume of provider devices during the future time period based on historical data;

generate a number of timeslots and a duration of timeslots within a set of timeslots to display from the predicted volume of transportation requests and the predicted volume of provider devices;

in response to receiving a user selection of the scheduled transportation request option, provide for display a scheduled transportation request graphical user interface comprising a set of timeslots according to the number of timeslots and the duration of the timeslots, pick-up times corresponding to the set of timeslots, arrival deadlines at the destination corresponding to the set of timeslots, and transportation values corresponding to the set of timeslots; and based on receiving a selection of a timeslot comprising a pick-up time, an arrival deadline, and a transportation value:

identify a set of requestor devices associated with the timeslot for potential matching with the requestor device based on user interaction with the timeslot via the set of requestor devices according to the selection of the timeslot from the scheduled transportation request graphical user interface;

monitor digital activity of the set of requestor devices associated with the timeslot;

generate, utilizing an efficiency transition model prior to a pick-up of the requestor device, a transportation group by matching an additional requestor device to the requestor device based on the selection of the timeslot and the arrival deadline from the scheduled transportation request graphical user interface;

determine one or more transportation modifiers for the timeslots;

provide for display to the additional requestor device, the scheduled transportation request graphical user interface comprising the set of timeslots and the one or more transportation modifiers; and provide navigational instructions to a provider device to service a transportation request and transport the requestor device and the additional requestor device in the transportation group such that the requestor device arrives at the destination by the arrival deadline.

12. The non-transitory computer-readable medium of claim 11, further comprising instructions that, when executed by the at least one processor, cause the computer system to provide, for display to the additional requestor device, the first graphical user interface comprising an additional transportation request option and an additional scheduled transportation request option to an additional destination.

13. The non-transitory computer-readable medium of claim 12, further comprising instructions that, when executed by the at least one processor, cause the computer system to:

determine the one or more transportation modifiers for the timeslots based on receiving the selection of the timeslot from the requestor device and in response to receiving an additional selection of the additional scheduled transportation request option from the additional requestor device:

determine, in response to receiving the selection of the timeslot, a balance of transportation requests corresponding to the set of timeslots; and determine the one or more transportation modifiers based on the balance of transportation requests.

14. The non-transitory computer-readable medium of claim 13, wherein the one or more transportation modifiers comprises at least one of: a color modifier, a size modifier, or a transportation value modifier.

15. A system comprising:

at least one processor; and at least one non-transitory computer-readable storage medium storing instructions that, when executed by the at least one processor, cause the system to:

provide, for display to a requestor device, a first graphical user interface comprising a current transportation request option and a scheduled transportation request option to a destination;

determine a predicted volume of transportation requests during a future time period and a predicted volume of provider devices during the future time period based on historical data;

generate a number of timeslots and a duration of timeslots within a set of timeslots to display from the predicted volume of transportation requests and the predicted volume of provider devices;

in response to receiving a user selection of the scheduled transportation request option, provide for display a scheduled transportation request graphical user interface comprising a set of timeslots according to the number of timeslots and the duration of the timeslots, pick-up times corresponding to the set of timeslots, arrival deadlines at the destination corresponding to the set of timeslots, and transportation values corresponding to the set of timeslots; and based on receiving a selection of a timeslot comprising a pick-up time, an arrival deadline, and a transportation value:

identify a set of requestor devices associated with the timeslot for potential matching with the requestor device based on user interaction with the timeslot via the set of requestor devices according to the selection of the timeslot from the scheduled transportation request graphical user interface;

monitor digital activity of the set of requestor devices associated with the timeslot;

generate, utilizing an efficiency transition model prior to a pick-up of the requestor device, a transportation group by matching an additional requestor device of the set of requestor devices associated with the timeslot to the requestor device based on the selection of the timeslot and the arrival deadline from the scheduled transportation request graphical user interface;

determine one or more transportation modifiers for the timeslots;

provide for display to the additional requestor device, the scheduled transportation request graphical user interface comprising the set of timeslots and the one or more transportation modifiers and provide navigational instructions to a provider device to service a transportation request and transport the requestor device and the additional requestor device in the transportation group according to the selection of the timeslot from the scheduled transportation request graphical user interface such that the requestor device arrives at the destination by the arrival deadline.

16. The system of claim 15, further comprising instructions that, when executed by the at least one processor, cause the system to:

identify user interaction with the timeslot via the set of requestor devices;

determine, via global positioning systems of the set of requestor devices, that the set of requestor devices are located within a geographic region; and determine the transportation group by applying a cost function to the set of requestor devices subject to a constraint satisfying the arrival deadline.

17. The system of claim 16, further comprising instructions that, when executed by the at least one processor, cause the system to determine the arrival deadline by:

determining a distribution of historical transportation times to the destination;

applying a confidence threshold to distribution of historical transportation times to determine a confidence arrival deadline; and applying a buffer to the confidence arrival deadline to determine the arrival deadline.

18. The system of claim 17, further comprising instructions that, when executed by the at least one processor, cause the system to:

receiving an additional transportation request comprising an additional arrival deadline associated with the additional requestor device;

matching the requestor device and the additional requestor device by determining a route for servicing the transportation request and the additional transportation request;

determining estimated arrival times for the route; and determining that the estimated arrival times satisfy the arrival deadline and the additional arrival deadline utilizing the confidence threshold.

19. The system of claim 15, further comprising instructions that, when executed by the at least one processor, cause the system to:

identifying a walking component for the transportation request;

determining a walking efficiency metric corresponding to the walking component; and based on determining that the walking efficiency metric satisfies a walking efficiency threshold, providing an option corresponding to the walking component within the first graphical user interface.

20. The system of claim 15, wherein the scheduled transportation request option comprises a shared transportation request option.

* * * * *